United States Patent [19]

Silveri

[11] Patent Number: 5,759,384
[45] Date of Patent: Jun. 2, 1998

[54] SPA HALOGEN GENERATOR AND METHOD OF OPERATING

[75] Inventor: Michael A. Silveri, Incline Vilage, Nev.

[73] Assignee: Bioquest, Reno, Nev.

[21] Appl. No.: 645,034

[22] Filed: May 13, 1996

Related U.S. Application Data

[63] Continuation of Ser. No. 413,248, Mar. 30, 1995, abandoned.

[51] Int. Cl.⁶ .............. C25B 1/24; C25B 15/02; C25B 9/00; C25B 11/10
[52] U.S. Cl. .............. 205/743; 205/744; 204/212; 204/225; 204/268; 204/273; 204/293; 204/290 R; 204/290 F; 204/228
[58] Field of Search .............. 204/273, 268, 204/212, 228, 225, 293, 290 F, 290 R; 205/743, 744, 215

[56] References Cited

U.S. PATENT DOCUMENTS

| | | | |
|---|---|---|---|
| 844,262 | 2/1907 | Dietrich | 204/229 |
| 1,301,832 | 4/1919 | Gerber | 204/212 |
| 1,851,435 | 10/1932 | Jessup | 254/134.4 |
| 2,331,518 | 10/1943 | Trier et al. | 137/1 |
| 2,530,524 | 11/1950 | Hlavin | |
| 2,823,101 | 2/1958 | Jockers et al. | 423/387 |
| 2,864,750 | 12/1958 | Hughes, Jr. et al. | 204/149 |
| 2,887,444 | 5/1959 | Lindstaedt | 204/152 |
| 2,987,453 | 6/1961 | Du Rose | 205/284 |
| 3,022,177 | 2/1962 | Fitch | 106/1.23 |
| 3,092,566 | 6/1963 | Negus | 204/240 |

(List continued on next page.)

FOREIGN PATENT DOCUMENTS

| | | |
|---|---|---|
| 206934 | 3/1974 | Argentina . |
| 206935 | 5/1974 | Argentina . |
| 569026 | of 0000 | Australia . |
| 43263 | 12/1973 | Australia . |
| 126365 | 4/1979 | Australia . |
| 11632 | 8/1983 | Australia . |
| 0537528A1 | 4/1993 | European Pat. Off. . |
| 2080449 | 1/1971 | France . |
| 1140060 | 2/1971 | France . |

(List continued on next page.)

OTHER PUBLICATIONS

Halogen Systems Advertisement (Mailer), distributed Sep. 1989.
Halogen Systems Advertisement (Flyer), distributed Nov. 1989.
Halogen System Brochure, printed Nov. 1990.
Marks, L., *Mechanical Engineering Handbook*, pp. 258–259 (3rd Ed. 1930).
"Electrode Process and Electrochemical Engineering", Configuration of Electrolyzers, pp. 257–260, Fumio Hine, No Date.

(List continued on next page.)

*Primary Examiner*—Donald R. Valentine
*Attorney, Agent, or Firm*—Knobbe, Martens, Olson & Bear LLP

[57] ABSTRACT

A halogen generator produces a halogen sanitizing agent to sanitize water in a spa or other water feature. A coaxial wall fitting desirably couples the halogen generator to the water feature. The halogen generator desirably includes a bipolar electrolytic cell in which a center electrode plate rotates between stationary anode and cathode plates. The bipolar electrode includes a plurality of vanes which motivate water flow between the anode and the cathode. The vanes on the rotating electrode also produce a flow of water through the generator. In this manner, the bipolar electrode functions as a impeller to pump water through the halogen generator. The vanes are positioned between the electrode and cathode, and are sufficiently spaced from the cathode to inhibit scale formation on the cathode. The vanes, however, generally do not contact the cathode when rotating. The rotational direction of the electrode relative to the cathode may be reversed periodically and/or the gap spacing between electrode and the cathode may be decreased periodically to enhance removal of scale.

69 Claims, 18 Drawing Sheets

5,759,384
Page 2

U.S. PATENT DOCUMENTS

| | | | |
|---|---|---|---|
| 3,177,131 | 4/1965 | Angell et al. | 204/98 |
| 3,180,813 | 4/1965 | Wasp et al. | 204/129 |
| 3,222,269 | 12/1965 | Stanton | 204/270 |
| 3,222,270 | 12/1965 | Edwards | 204/269 |
| 3,223,242 | 12/1965 | Murray | 210/139 |
| 3,283,123 | 11/1966 | Atkinson et al. | 219/307 |
| 3,305,472 | 2/1967 | Oldershaw et al. | 204/268 |
| 3,334,035 | 8/1967 | Dews et al. | 204/130 |
| 3,336,220 | 8/1967 | Neidl | 210/14 |
| 3,351,542 | 11/1967 | Oldershaw et al. | 204/149 |
| 3,361,663 | 1/1968 | Murray et al. | 204/278 |
| 3,378,479 | 4/1968 | Colvin et al. | 204/248 |
| 3,414,497 | 12/1968 | Kanai | 204/149 |
| 3,432,420 | 3/1969 | Pan | 204/216 |
| 3,458,414 | 7/1969 | Crane et al. | 204/149 |
| 3,493,478 | 2/1970 | Udupa et al. | 204/82 |
| 3,518,176 | 6/1970 | Reyes et al. | 204/159.12 |
| 3,552,568 | 1/1971 | Wade | 210/169 |
| 3,563,879 | 2/1971 | Richards et al. | 204/272 |
| 3,583,897 | 6/1971 | Fulweiler | 204/273 X |
| 3,598,536 | 8/1971 | Christensen | 23/267 A |
| 3,623,970 | 11/1971 | Haas | 204/314 |
| 3,645,862 | 2/1972 | Cotton et al. | 204/290 F X |
| 3,663,280 | 5/1972 | Lee | 204/290 F X |
| 3,669,857 | 6/1972 | Kirkham et al. | 204/151 |
| 3,684,460 | 8/1972 | Arneson | 23/267 A |
| 3,706,646 | 12/1972 | Gibson, Jr. et al. | 204/149 |
| 3,736,322 | 5/1973 | Helber et al. | 204/266 |
| 3,752,747 | 8/1973 | Treharne et al. | 204/149 |
| 3,766,045 | 10/1973 | Itakura et al. | 204/275 |
| 3,767,557 | 10/1973 | Lamm | 204/263 |
| 3,778,858 | 12/1973 | Fuller | 15/104.1 R |
| 3,790,464 | 2/1974 | Greaves | 204/212 |
| 3,792,979 | 2/1974 | Clinton | 23/267 A |
| 3,793,178 | 2/1974 | Austin et al. | 204/272 |
| 3,822,017 | 7/1974 | Rast . | |
| 3,825,484 | 7/1974 | Fronsman et al. . | |
| 3,831,593 | 8/1974 | Ochoa | 128/66 |
| 3,835,018 | 9/1974 | Casanovas et al. | 204/228 |
| 3,835,020 | 9/1974 | Galneder | 204/268 |
| 3,893,902 | 7/1975 | Loftfield et al. | 204/95 |
| 3,900,377 | 8/1975 | Enns et al. | 204/149 |
| 3,926,754 | 12/1975 | Lee | 204/152 |
| 3,926,770 | 12/1975 | Hoekje | 204/256 |
| 3,926,771 | 12/1975 | Lieb et al. | 204/268 |
| 3,945,905 | 3/1976 | Persson | 204/149 X |
| 3,957,599 | 5/1976 | Lindsay et al. | 204/105 R |
| 3,963,592 | 6/1976 | Lindstrom | 204/98 |
| 3,972,794 | 8/1976 | Lamm | 204/266 |
| 3,986,942 | 10/1976 | Cook, Jr. | 204/98 |
| 4,012,296 | 3/1977 | Stephens et al. | 204/98 |
| 4,029,565 | 6/1977 | Bender et al. | 204/256 |
| 4,039,417 | 8/1977 | Sasaki et al. | 204/196 |
| 4,055,477 | 10/1977 | Johnson | 204/269 |
| 4,081,875 | 4/1978 | Nishino | 15/104.06 R |
| 4,085,028 | 4/1978 | McGallum | 204/269 |
| 4,097,356 | 6/1978 | Yates | 204/237 |
| 4,100,052 | 7/1978 | Stillman | 204/268 |
| 4,121,991 | 10/1978 | Miller et al. | 204/260 |
| 4,124,480 | 11/1978 | Stevenson | 204/268 |
| 4,129,493 | 12/1978 | Tighe et al. | 204/228 |
| 4,132,619 | 1/1979 | Klein et al. | 204/242 |
| 4,136,005 | 1/1979 | Persson et al. | 204/266 |
| 4,169,028 | 9/1979 | Yokoyama et al. | 204/147 |
| 4,188,278 | 2/1980 | Reis et al. | 204/268 |
| 4,193,858 | 3/1980 | King | 204/268 |
| 4,194,953 | 3/1980 | Hatherly | 204/95 |
| 4,196,068 | 4/1980 | Scoville | 204/255 |
| 4,200,230 | 4/1980 | Gould | 239/66 |
| 4,201,651 | 5/1980 | Themy | 204/217 |
| 4,202,738 | 5/1980 | Stillman . | |
| 4,214,958 | 7/1980 | Coker et al. | 204/98 |
| 4,229,272 | 10/1980 | Yates | 204/128 |
| 4,241,025 | 12/1980 | Grayson, IV et al. | 422/263 |
| 4,248,690 | 2/1981 | Conkling | 204/268 |
| 4,248,715 | 2/1981 | Olivier | 204/260 |
| 4,255,246 | 3/1981 | Davis et al. | 204/228 |
| 4,256,552 | 3/1981 | Sweeney | 204/98 |
| 4,263,114 | 4/1981 | Shindell | 204/149 |
| 4,290,873 | 9/1981 | Weaver | 204/228 |
| 4,308,117 | 12/1981 | Sweeney | 204/101 |
| 4,308,123 | 12/1981 | Lynn | 204/266 |
| 4,317,709 | 3/1982 | Ichisaka et al. | 204/268 |
| 4,330,412 | 5/1982 | Frederick | 210/805 |
| 4,333,773 | 6/1982 | Fjallstrom | 2134/22 C |
| 4,334,968 | 6/1982 | Sweeney | 204/96 |
| 4,337,136 | 6/1982 | Dahlgren | 204/242 |
| 4,361,471 | 11/1982 | Kosarek | 204/128 |
| 4,363,713 | 12/1982 | Bindon | 204/278 |
| 4,368,550 | 1/1983 | Stevens | 4/507 |
| 4,411,759 | 10/1983 | Olivier | 204/260 |
| 4,419,207 | 12/1983 | Bindon | 204/237 |
| 4,422,919 | 12/1983 | Fabian et al. | 204/270 |
| 4,439,295 | 3/1984 | Richards | 204/229 |
| 4,472,256 | 9/1984 | Hilbig | 204/266 |
| 4,492,618 | 1/1985 | Eder | 204/152 |
| 4,495,048 | 1/1985 | Murakami et al. | 204/267 |
| 4,525,253 | 6/1985 | Hayes et al. | 204/149 |
| 4,535,255 | 8/1985 | Ochii et al. | 307/264 |
| 4,555,323 | 11/1985 | Collier | 204/258 |
| 4,565,617 | 1/1986 | Ahuja | 204/229 |
| 4,584,106 | 4/1986 | Held | 210/754 |
| 4,599,159 | 7/1986 | Hilbig | 204/266 |
| 4,613,415 | 9/1986 | Wreath et al. | 204/98 |
| 4,657,670 | 4/1987 | Newton . | |
| 4,701,265 | 10/1987 | Carlsson et al. | 210/744 |
| 4,714,534 | 12/1987 | Fair et al. | 204/269 |
| 4,719,018 | 1/1988 | Przybylski | 210/748 |
| 4,726,564 | 2/1988 | Lynn | 254/134.4 |
| 4,767,511 | 8/1988 | Aragon | 204/128 |
| 4,789,448 | 12/1988 | Woodhouse | 204/228 |
| 4,790,923 | 12/1988 | Stillman | 204/268 |
| 4,818,389 | 4/1989 | Tobias et al. | 210/169 |
| 4,857,112 | 8/1989 | Franninge | 134/22.52 |
| 4,861,451 | 8/1989 | David | 204/230 |
| 4,917,782 | 4/1990 | Davies . | |
| 4,935,116 | 6/1990 | LeMire . | |
| 4,935,980 | 6/1990 | Leginus et al. | 15/1.7 |
| 4,936,979 | 6/1990 | Brown | 210/85 |
| 4,986,906 | 1/1991 | Dadisman | 210/169 |
| 4,992,156 | 2/1991 | Silveri | 204/228 |
| 4,997,540 | 3/1991 | Howlett | 204/271 |
| 5,013,417 | 5/1991 | Judd, Jr. | 204/228 |
| 5,034,110 | 7/1991 | Gore et al. | 204/228 |
| 5,037,519 | 8/1991 | Wiscombe | 204/237 |
| 5,059,296 | 10/1991 | Sherman | 204/228 |
| 5,094,734 | 3/1992 | Torrado | 204/234 |
| 5,221,444 | 6/1993 | Silveri | 204/149 |
| 5,228,964 | 7/1993 | Middleby | 204/194 |
| 5,254,226 | 10/1993 | Williams et al. | 204/128 |

FOREIGN PATENT DOCUMENTS

| | | |
|---|---|---|
| 2238844 | 2/1973 | Germany . |
| 3430610A1 | 2/1986 | Germany . |
| 3635 | 10/1986 | Germany . |
| 2227182 | 9/1909 | Japan . |
| WO8601543 | 3/1986 | WIPO . |
| WO9010734 | 9/1990 | WIPO . |

OTHER PUBLICATIONS

Purex Service Manual, E–18 Jan. 1974, AU–MOAU Series Pumps.

Little Giant Pump Company, Tecumseh Products Company, Instruction Sheet, No Date.

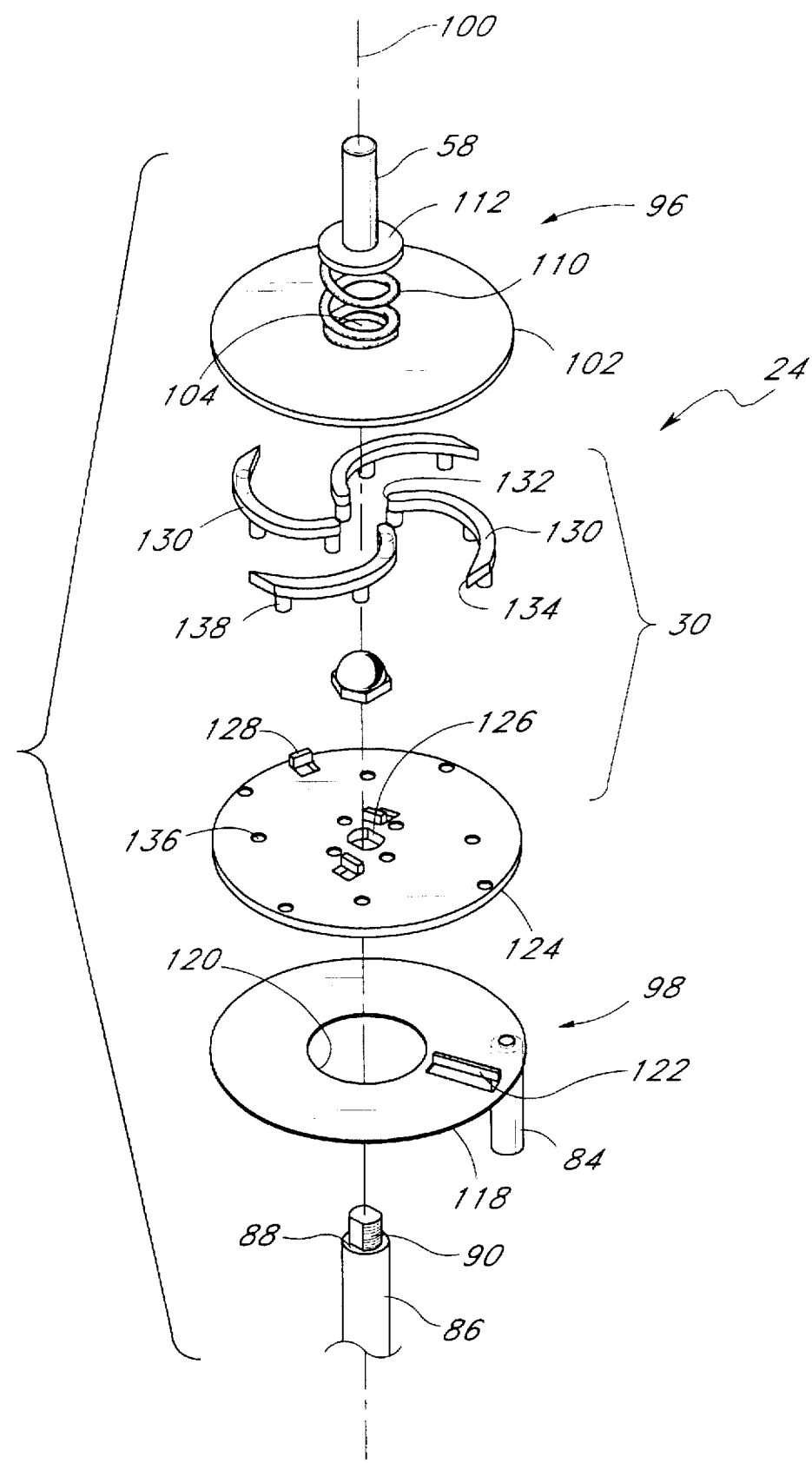

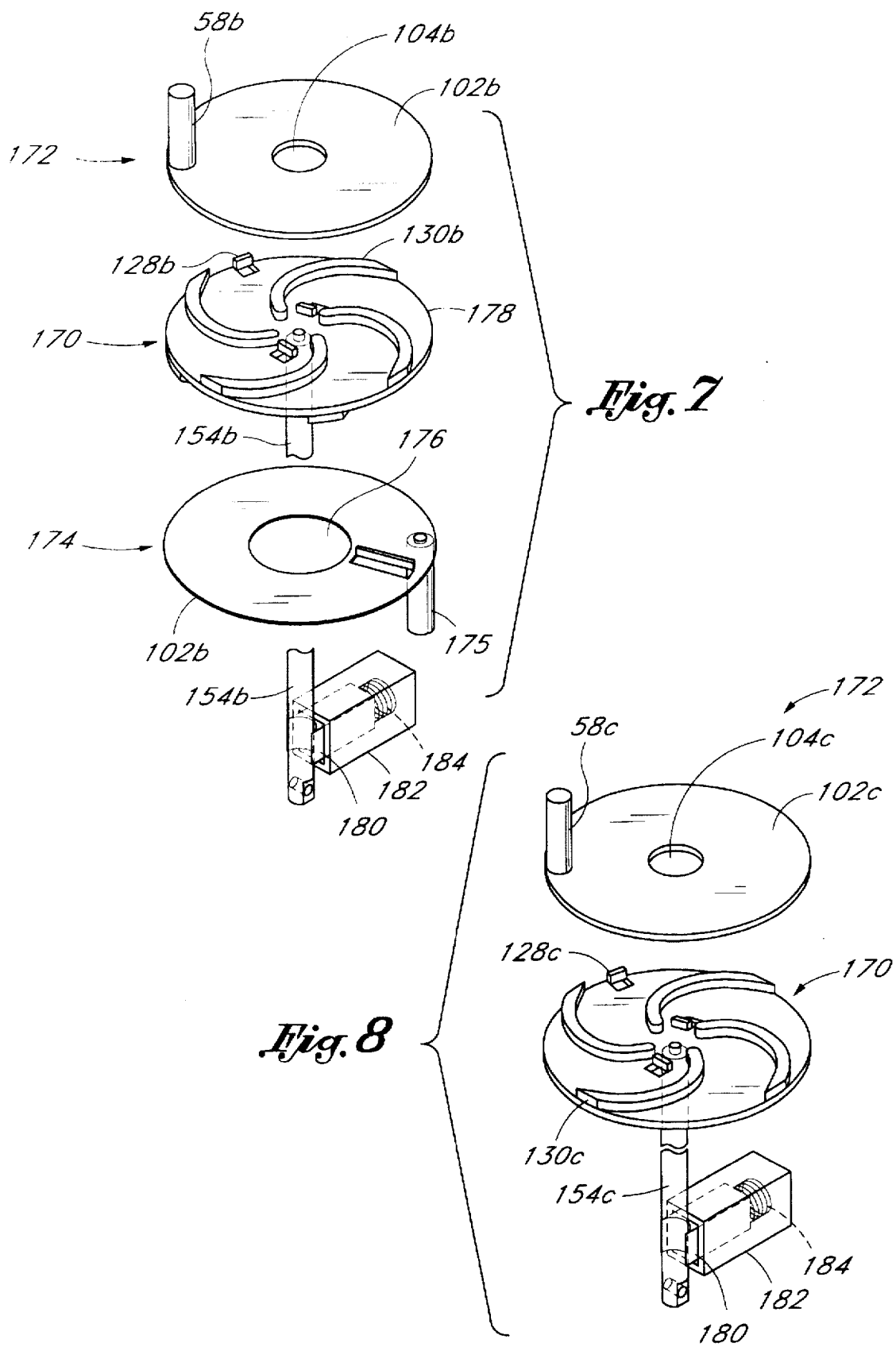

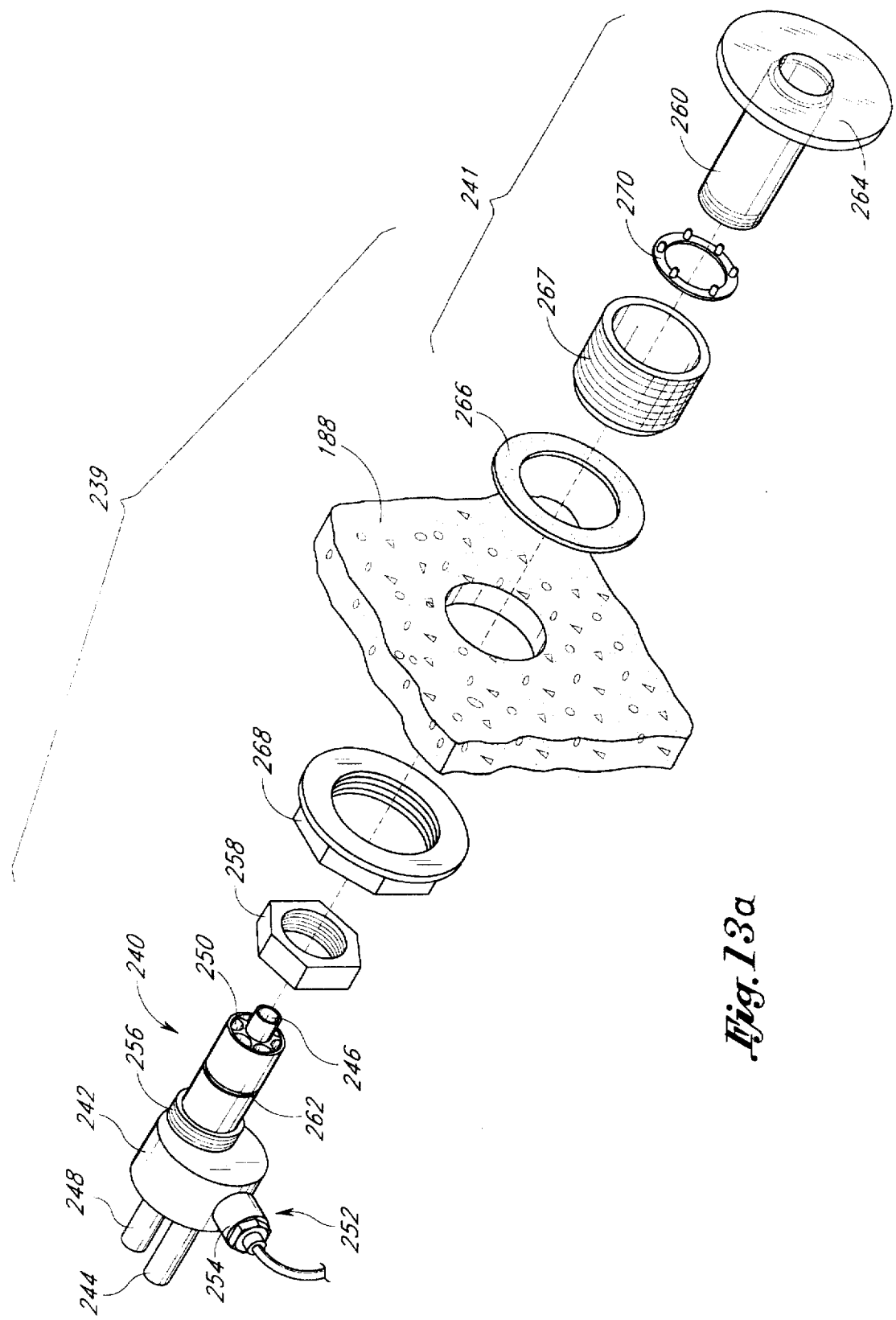

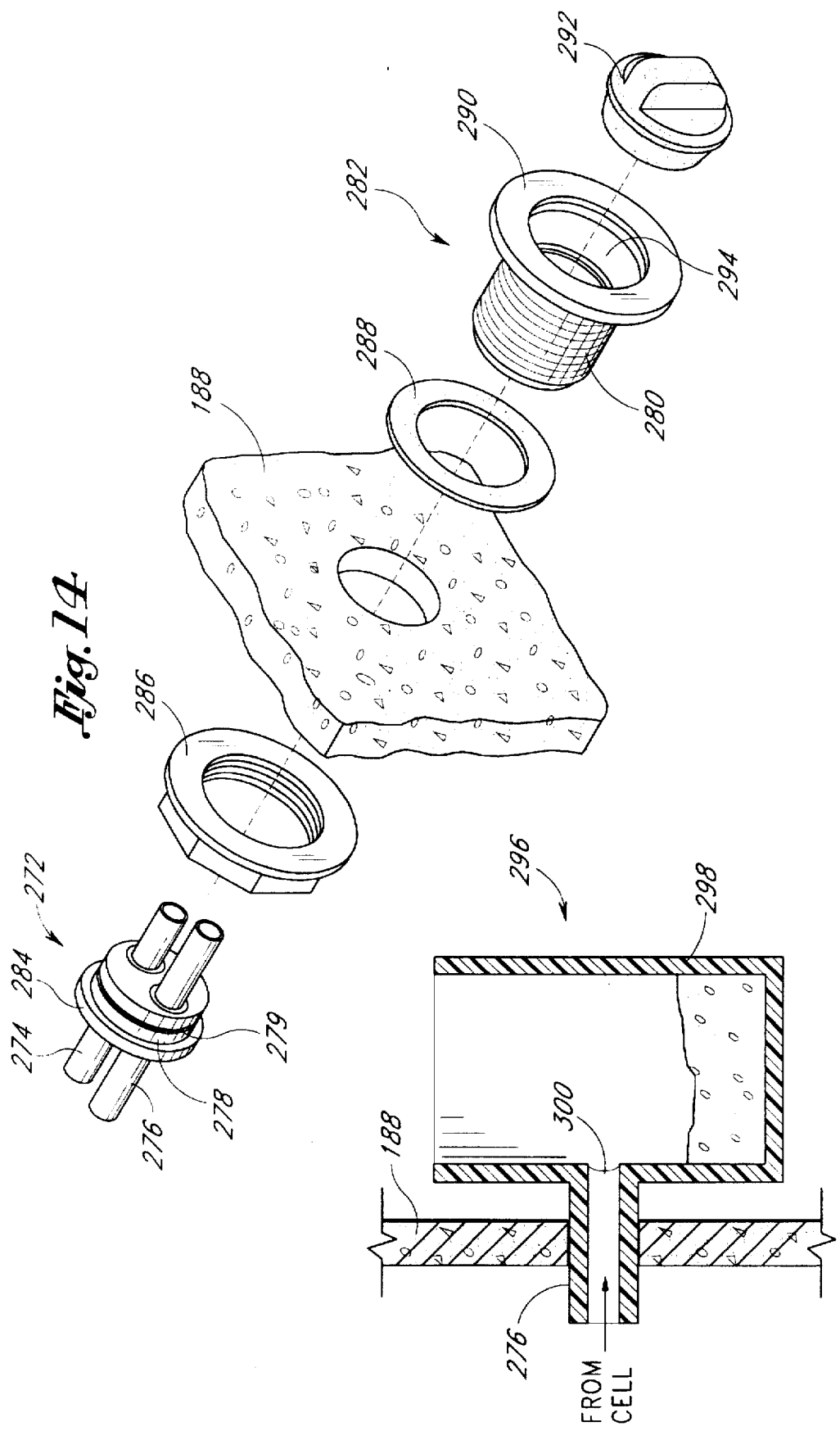

SPA HALOGEN GENERATOR AND METHOD OF OPERATING

RELATED CASE

This application is a continuation of application Ser. No. 08/413,248, filed Mar. 30, 1995, now abandoned.

BACKGROUND OF THE INVENTION

1. Field of the Invention

The present invention relates to a water purification system, and more particularly to a halogen generator.

2. Description of Related Art

Portable self-contained spas have become popular in recent years. Such spas are easy installed and powered by existing electrical lines or dedicated electrical hook-ups.

Once installed, the homeowner must sanitize the spa to prevent the proliferation of disease-causing microorganisms, such as, for example, Pseudomonas aeruginosa. Typical spa maintenance requires adding granular sodium dichloro-isocyanurate as a sanitizing agent to control such bacteria growth. Bromine alternatively can be added as a sanitizing agent. Bromine preferably is used as the sanitizing agent in the spa because it remains in liquid form at 100° F., unlike chlorine.

Many spa owners today, however, do not properly maintain their spas. Some owners do not adequately sanitize their spas despite the danger of unhealthful bacteria growth. Other owners over-sanitize their spas which can damage spa equipment, including the heater or the spa shell.

In the pool industry, some pool owners recently have used electrolytic cells with their pool or spa to produce chlorine or bromine automatically by electrolysis. Such electrolytic cells eliminate the need to constantly adjust the chlorine or bromine levels by adding chemicals to the pool. Examples of electrolytic cells used to generate sanitizing agents are disclosed in U.S. Pat. Nos. 4,992,156, 4,790,923, and 4,201,651.

Although such electrolytic cells simplify the proper maintenance of chemical levels in the pool, other problems arise in connection with their use. Many pool owners commonly neglect the filtration system of the pool, which, as a result, clogs and reduces the flow rate through the water circulation line. Because prior electrolytic cells commonly are connected in series with the main spa circulation line and depend on a minimum flow rate through the cell, the effectiveness of the cell decreases. In addition, an insufficient flow rate through the cell may present the potential for explosion as such cells commonly produce hydrogen and oxygen gases which become entrapped within the cell if not flushed into the pool by water flow through the cell.

Scaling or plating out of calcium carbonate and other salts on the cathode of the electrolytic cell during operation presents another formidable maintenance problem associated with electrolytic units used in hard water. In water having a hardness greater than 700 parts per million ("hard water"), scale deposits from the water and builds up on surfaces adjacent to a water flow. Electrolytic cells used in hard water commonly experience significant scale build-up which causes water flow problem. Scale typically builds up and clogs small openings and conduits in the equipment. Thus, some manufacturers recommend using their equipment in water having a total hardness less than 300 parts per million.

Other manufacturers of electrolytic cells have attempted to resolve the problems associated with scaling in a variety of ways; however, prior attempts offer less than an adequate solution. Prior electrolytic cells which reverse the polarity of the electrodes to remove scale tend to have shortened electrode life. Other electrolytic cells have relied on high flow water rates through the cell to remove scale, but flow through the cell may be affected by the inefficiency of an external pump or by a clogged filter. And some manufacturers recommend manually cleaning of the cell electrodes by soaking them in acid. Although effective, this process is dangerous, time-consuming, and may not be feasible, given the industry trend toward limiting consumer access to the spa equipment.

SUMMARY OF THE INVENTION

In view of the deficiencies associated with prior electrolytic cell devices, there exists a need for a halogen generator for use with portable spas and other water features which is highly resistant to the formation of undesirable scale deposits on the electrodes resulting from operation in hard water and/or high temperatures and which eliminates the need to reverse electrode polarity as a means for removing scale deposits on the cathode. A need also exists for a halogen generator which operates independently of a water circulation pump of the water feature (e.g., the spa).

In accordance with an aspect of the present invention, a halogen generator produces a halogen sanitizing agent in a body of water of a water feature. The generator comprises a cathode and an anode which are spaced apart from each other within a housing. At least one vane is positioned between the cathode and anode. The vane and the cathode are mounted to rotate relative to each other with the vane being sufficiently closely spaced to the cathode to inhibit scale formation on the cathode. The vane, however, generally does not contact the cathode.

Another aspect of the present invention involves a halogen generator for producing a halogen sanitizing agent in a body of water of a water feature. The halogen generator comprises a bipolar cell which includes at least one electrode positioned between an outer anode and an outer cathode. The electrode is mounted to rotate relative to the anode and to the cathode. A source of electricity is connected to the anode and to the cathode without connection to the rotary electrode.

An additional aspect of the present invention involves a spa system which comprises a spa body, a pump, and a main water circulation line for conveying water from the pump to the spa body. The main line communicates with the spa body through at least a return port. A bypass line communicates with the main circulation line through at least an inlet to the bypass line. A check valve is positioned in the main line between the bypass inlet and the return port. The spa system also includes an electrolytic cell which communicates with the bypass line.

In accordance with a further aspect of the present invention, a spa system comprises a spa body, a first water circulation line, and a second water circulation line. The first water circulation line communicates with the spa body. The second water circulation line also communicates with the spa body, but independent of the first water circulation line. The spa system also includes a pump positioned within the first water circulation line and a halogen generator positioned in the second water circulation line. The halogen generator comprises an electrolytic cell.

An additional aspect of the present invention involves a fitting for coupling a halogen generator to a spa body. The fitting comprises an inner member positioned within the spa body and an outer member positioned outside the spa body. The inner and outer members are adapted to releasably engage each other with a wall of the spa body interposed between the inner and outer members. The inner and outer members together define first and second conduits which communicate with the spa body. The outer member has a first port which is adapted to communicate with an inlet of a halogen generator and a second port which is adapted to communicated with an outlet of the halogen generator. The first port communicates with the first conduit defined between said inner and outer members, and the second port communicates with the second conduit defined between the inner and outer members.

Another aspect of the present invention involves a wall fitting for a spa. The fitting comprises a first tubular member connected to a translucent end cap. The first tubular member and the end cap together define a fluid passage which extends through the first tubular member and the end cap. A second tubular member is positioned about the first tubular member and is connected to the end cap so as to define a generally sealed chamber at the end of the second tubular member adjacent to the end cap. An optical source is positioned within the chamber defined between the first and second tubular members so as to be visible through the end cap when lit.

Another aspect of the present invention involves a method of inhibiting scale buildup in an electrolytic cell between two electrodes separated by a space. Water is flowed through the space between the electrodes in a first direction while operating the cell. The direction of the water flow between the electrode is then reversed to displace a substantial portion of scale deposits on the electrode.

In accordance with a preferred method of inhibiting scale buildup between two spaced electrodes, at least one abrading member is positioned between the electrodes. The abrading member is spaced from a first electrode of the electrode pairing by a first distance. The abrading member is rotated with respect to the first electrode, and the space between the abrading member and the first electrode is decreased. In this manner, the abrading member contacts and knocks off scale buildup on the electrode. The abrading member preferably is a vane or a tab which protrudes toward the first electrode.

An additional aspect of the present invention relates to a method of operating a halogen generator which includes an electrolytic cell mounted in a water circulation line of a water feature. The method involves sensing the ionic potential of the water within the water circulation line and determining whether the sensed ionic potential is below a pre-determined ionic potential level. An activation signal is generated if the sensed ionic potential is less than the pre-determined ionic potential level. An electrolytic cell is energized in response to the activation signal, and a water flow is produced through the electrolytic cell while the electrolytic cell is energized.

BRIEF DESCRIPTION OF THE DRAWINGS

These and other features of the invention will now be described with reference to the drawings of preferred embodiments which are intended to illustrate and not to limit the invention, and in which:

FIG. 2 is an exploded perspective view of an electrolytic cell of the halogen generator of FIG. 1 wherein a rotating bipolar electrode is positioned between a non-rotating anode and a non-rotating cathode;

FIG. 7 is an exploded perspective view of an another electrode assembly for use with the halogen generator of FIG. 6, wherein a rotating anode is positioned between two non-rotating cathodes;

FIG. 8 is an exploded perspective view of an additional electrode assembly for use with the halogen generator of FIG. 6 wherein a rotating anode is positioned adjacent a non-rotating cathode;

FIG. 12b is an exploded view of a bypass check valve and T-connection fitting of FIG. 12a;

FIG. 13a is an exploded perspective view of a coaxial wall mount fitting assembly configured in accordance with a preferred embodiment of the present invention;

FIG. 14 is an exploded perspective view of a wall mount fitting assembly configured in accordance with another preferred embodiment of the present invention;

FIG. 15 is a cross-sectional view of a scale trap for use with the present halogen generator;

DETAILED DESCRIPTION OF THE PREFERRED EMBODIMENTS

Figure 1:
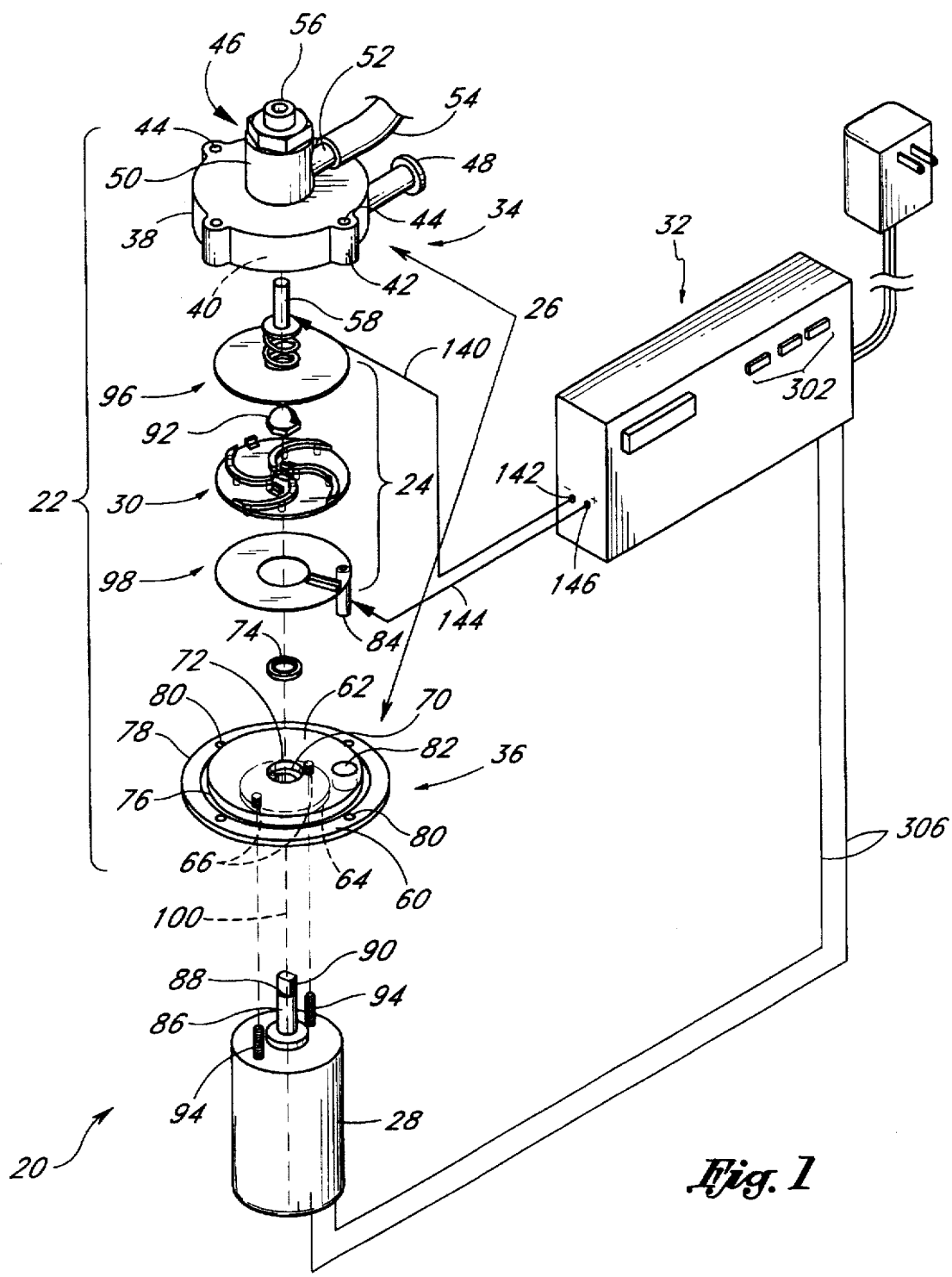
FIG. 1 is an exploded perspective view of a halogen generator configured in accordance with a preferred embodiment of the present invention.

FIG. 1 illustrates a halogen generator 20 configured in accordance with a preferred embodiment of the present invention. The halogen generator 20 electrolytically generates chlorine, bromine, or other halogens from a corresponding dilute solution of halide (e.g., sodium chloride, sodium bromide, etc.). In this manner, the halogen generator 20 can be used to produce a pH neutral halogen (e.g., bromine) which operates as a sanitizing agent in a body of water as known in the art.

The present halogen generator 20 is particularly well suited for use with portable, self-contained spas (e.g., Jacuzzis®). It is contemplated, however, that the present halogen generator 20 can be used with other types of water features, such as, for example, swimming pools, built-in spas, water fountains, industrial cooling towers and the like. The arrangement of the generator 20 with and the fittings used to incorporate the generator 20 into such water features will be described below, after a detailed description of the halogen generator 20 itself.

As seen in FIG. 1, the halogen generator 20 principally comprises a cell assembly 22 formed by an electrolytic cell 24 and a volute assembly 26 which houses the cell 24. A motor 28 drives an impeller 30 of the cell assembly 22 to create a flow of water through the cell 24, as described below.

The halogen generator 20 also cooperates with a power supply controller 32. The controller 32 controls the operation of the electrolytic cell 24 and the motor 28. The individual components of the halogen generator 20 will now be described in detail with reference to FIGS. 1 and 2.

Volute Assembly

The volute assembly 26 comprises a volute 34 and a volute plate 36 which together define an internal cavity in which the electrolytic cell 24 is housed. The volute 34 includes a generally cup-shaped housing 38 with a central cavity 40 having a cylindrical shape. The volute 34 also includes a plurality of lugs 42 which extend outwardly from the housing 38. A bolt hole 44 passes through each lug 42.

As understood from FIG. 1, the volute 34 includes an inlet port 46 and an outlet port 48. The inlet port 46 is configured to direct water flow into the central cavity 40 at the center of the cavity 40. The outlet port 48 is positioned on the peripheral edge of the housing 38, generally tangentially to the cylindrical central cavity 40 of the housing 28. This position of the outlet port 48 encourages water flow through the volute 34, as known in the art.

In the illustrated embodiment, the volute water inlet 46 includes a tubular segment 50 which extends axially from the center of the volute 34 and supports a bib 52. The bib 52 extends generally perpendicular to tubular segment 50. A water inlet conduit 54, which communicates with the water feature (e.g., the spa circulation system), is attached to the inlet port bib 52 to supply water to cell assembly 22.

The bib 52 communicates with the tubular segment 50 to form an inlet flow path though the inlet port 46. So configured, the flow path through the inlet port 46 turns 90° from the bib 52 into the tubular segment 50 to direct the flow of water into the cylindrically shaped central cavity 40 at the center of the cavity 40 and in a direction along the axis of the cavity 40.

As seen in FIG. 1, a plug 56 seals an outer end of the tubular segment 50. The plug 56 desirably has a tubular shape which allows a central terminal post 58 of the electrolytic cell 24 to extend through and out of the plug 56, as described below. The plug 56 desirably includes an O-ring (not shown) which sits against the terminal post 58 such that the plug 56 forms a seal between the tubular segment 50 and the cell terminal post 58 to prevent water flow through the outer end of the tubular segment 50. The plug 56 thus seals the fluid path through the inlet port 46.

The volute plate 36 of the volute assembly 26 includes a disc-shaped body 60 with raised central portions 62, 64 on either side of the body 60. The inner central portion 62 on the inner side of the volute plate 36 (i.e., the side which mates with the volute 24) desirably has a shape which is sized to snugly fit within the central cavity 40 of the volute 24. In the illustrated embodiment, the inner portion 62 has a cylindrical shape of a diameter which generally matches the diameter of the inner cavity. In this manner, the central portion 62 generally closes and seals the open end of the volute 34 so as to form the interior cavity of the cell assembly 22.

With reference to FIG. 1, the outer central portion 64 of the volute plate 36 has a size and shape to generally match that of an end of the motor 28. In the illustrated embodiment, the outer central portion 64 has a disc-like shape of a smaller diameter than the body 60 of the volute plate 36.

The body 60 and the outer central portion 64 of the volute plate 36 together define at least a pair of holes which extend into the volute plate 36 from its outer side. The holes are sized to receive threaded inserts 66 that are used to attach the motor 28 to the volute plate 36, as described below. The threaded inserts 66 desirably consist of stainless steel and are cemented to or integrally molded into the volute plate 36. In the illustrated embodiment, the holes lie on diametrically opposite sides of the center of the volute plate 36.

The volute plate 36 also defines a central bore 70 through its axial center with a first counterbore 72 circumscribing the bore 70 on the inner side of the plate 36. The counterbore 72 forms a seat for a conventional mechanical pump seal 74, as described below. A second counterbore (not shown) extends into the outer central portion 64 to form a relief.

The volute plate 36 also includes a circular groove 76 in the flange 78 which circumscribes the inner central portion 62. The groove 76 provides a seat for an O-ring (not shown). When assembled, the volute 34 and volute plate 36 compress the O-ring between an end of the volute 34 and the outer flange 78 to seal the union between these components.

A plurality of bolt holes 80 extend through the volute plate 36 about the peripheral edge of the outer flange 78. The bolt holes 80 desirably align with the corresponding bolt holes 44 formed in lugs 42 of the volute 34. A plurality of fasteners (e.g., bolts and nuts) pass through the aligned bolt holes 44, 80 and attach the volute plate 36 to the volute 34 when assembled.

The volute plate 36 also includes a hole 82 which extends through the inner central portion 62 and the disc body 60 at a location within the O-ring groove 76. The hole 82 is sized to receive a terminal post 84 of an electrode of the electrolytic cell 24, as described below.

The volute 34 and volute plate 36 desirably are formed of a nonconductive polymer, such as, for example acrylonitrile-butadiene-styrene (ABS). These components can be constructed in any of a wide variety of ways which will be well known to one skilled in the art. For example, these components can be integrally molded such as by injection molding.

Drive Motor

FIG. 1 also illustrates the electric motor 28 which rotates the impeller 30 of the electrolytic cell assembly 22. The motor 28 may operate on either alternating or direct current (i.e., either an AC or DC motor) and desirably produces about 8 ounce-inches of torque or greater at a rotational speed of about 1,800–1,850 rpm. In the illustrated embodiment, the motor 28 is a 12 volt DC, 16 Watt motor with a diameter of about 1.6 inches. It is, of course, understood that those skilled in the art can readily select a variety of conventional motors of various sizes and rotational speed and torque specifications in order to suit a specific application of the generator.

Direct current motors have the advantage of very high starting torque and low cost. Either brush or brushless designs can be used with the present halogen generator 20. Motor speed can be any speed resulting in the requisite outlet water pressure. One thousand to five thousand rpm is sufficient. Erosion of the catalytic coating due to high velocity can be held to a minimum by turning the impeller 30 at 1,500 to 3,000 rpm. At 1,500 rpm, the tip speed is roughly 487 cm per second, which is not excessive for electrode coatings. As discussed in detail below, the actual velocity the anode experiences is substantially less than that because the water is accelerated to a speed close to that of the impeller 30, with only the cathode being exposed to the high-velocity water.

The motor 28 includes a drive shaft 86 which extends into the internal cavity of the volute assembly 22 when assembled. In the illustrated embodiment, the drive shaft 86 comprises 316 stainless steel.

The end of the drive shaft 86 includes a shoulder 88 and a threaded stud 90. The shoulder 88 is configured such that the impeller 30 of the electrolytic cell assembly 22 sits on the shoulder 88 of the drive shaft 86 when assembled. As understood from FIG. 1, the threaded stud 90 desirably includes a pair of opposing flats which extend axially from the shaft end toward the motor 28. The resultant truncated circular cross-sectional shape of the stud 90 corresponds to a similar shape of a central aperture in the impeller 30 to key the impeller 30 to the shaft 86, as described below.

A nonconductive cap nut 92 secures the impeller 30 to the drive shaft 28. The cap nut 92 desirably is made of 20% glass-filled polycarbonate or like nonconductive, corrosion-resistant material. The nonconductive cap nut 92 insulates the shaft 86 from the upper conductive surface of the impeller 30. In this manner, the shaft 86 is cathodically protected from corrosion as it only contacts one side (i.e., the underside) of the impeller 30, as explained further below.

As understood from FIG. 1, the motor 28 also includes a pair of mounting holes which extend longitudinally through the body of the motor 28. The mounting holes are sized to receive mounting bolts 94 which extend through the motor body and engage the threaded inserts 66 of the volute plate 36. In this manner, the motor 28 is secured to the volute assembly 26.

Electrolytic Cell

The electrolytic cell 24 includes at least one cathode 96 and at least one anode 98 which form an electrode pairing. In the illustrated embodiment, the cell 24 desirably includes two electrode pairings configured in a bipolar arrangement. That is, the cell 24 includes a cathode 96, an anode 98, and a bipolar electrode 30 (which functions as the impeller) interposed between the cathode 96 and the anode 98. The cathode 96 and the anode 98 polarize the corresponding sides of the electrode 30 such that one side of the electrode 30 function as an anode and the other side functions as a cathode to provide two cathode/anode pairings. As illustrated by the other embodiments of the electrolytic cell described below, however, any of a wide variety of cell configurations, which will be readily apparent to those skilled in the art, can be used with the present halogen generator 20.

FIG. 2 illustrates the electrolytic cell 24 in isolation. The bipolar cell 24 comprises the bipolar electrode 30 positioned between the cathode 96 and the anode 98. In the illustrated embodiment, the bipolar electrode 30, cathode 96, and anode 98 each have generally circular, disc-like shapes and are arranged in parallel along the common central axis 100.

The electrode 30, the cathode 96, and the anode 98 desirably have a diameter of less than about 10 inches, more preferably less than about 5 inches, and most preferably equal to about 2.5 inches. It is understood, however, that the electrode 30, cathode 96 and anode 98 can have any of a variety of other diameter sizes in order to suit a specific application and in order to give the anode 98 and cathode 96 a proper current density.

As described in detail below, both the cathode 96 and the anode 98 are mounted in a fixed rotational relationship within the cell assembly 22, while the bipolar electrode 30 rotates therebetween. In this manner, the bipolar electrode 30 functions as a pump impeller as described below.

The cathode 96 includes a circular plate 102 that defines a central bore 104 for the passage of water from the water inlet 46 of the volute 34 through the plate 102. The cathode plate 102 is made of an electrically conductive, corrosion resistant material. In the illustrated embodiment, the cathode plate 102 is made of 316L stainless steel or any other suitable metal, such as, for example copper or titanium. The cathode plate 102, however, also can be formed of a discontinuous material for enhancing scale removal from the cathode 96.

Figure 3:
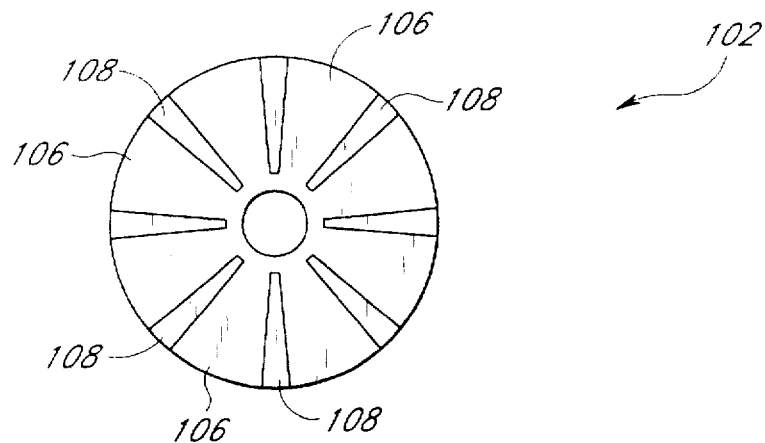
FIG. 3 is a plan view of an alternative cathode plate for use with the halogen generator of FIG. 1.

As seen in FIG. 3, the cathode plate 102 may comprise a plurality of radially extending fingers 106 of conductive material separated by gaps. The gaps are filled with an electrically inert potting material 108, such as epoxy, which gives the cathode plate 102 a generally flat circular disc-like shape defined by a plurality of intermittent finger 106 around the circumference thereof. Interlocking inserts (not shown) also could fill the gaps to prevent scale deposits from bridging the gaps.

As the scale develops on the fingers 106, the rotating bipolar electrode 30, and more particularly the vanes and/or tabs on the electrode 30, act to abrade the scale. Because the plate 30 is not a continuous circular disc, the scale forms discontinuously rather than monolithically around its circumference and thus is easier to remove. That is, the discontinuity of the scale formation allows the abrading surfaces (e.g., vanes) of the rotary electrode 30 to "get under" the scale deposit and remove it.

With reference back to FIG. 2, the thickness of the cathode plate 102 desirably ranges between about 0.020 and about 0.250 inches, and preferably equals about 0.032 inches. A thinner cathode plate has more flexibility than a thicker plate, and flexure of the plate 102 tends to promote scale removal. In addition, in the case where the cathode plate 102 moves away from the volute 34, as described below, the surface of the cathode plate 102 which faces the volute 34 preferably is coated to prevent scale buildup thereon. The side of the cathode plate 102 which faces the bipolar electrode 30, however, desirably is uncoated and can be polished to an Ra surface finish of 8 to 16, which has been found to reduce scale formation on this inner surface of the cathode plate 102.

The cathode 96 desirably includes the terminal post 58 which is electrically connected to the cathode plate 102. The terminal post 58 has a diameter of approximately 0.125 inches or larger; however, it is understood that the post 58 can have any of a variety of diameter sizes in order to suit a specific application. As understood from FIG. 1, the terminal post 58 has a sufficient length so as to extend through the plug 56 to expose its outer end.

The cathode plate 102 desirably can move axially (i.e., in a direction parallel to the central axis 100) to enhance descaling of the cathode plate 102, as explained below. The cathode plate 102, however, preferably is biased into a desired position for normal operation. For this purpose, the cathode may comprise a biasing element or mechanism 110, such as a spring, which biases the cathode plate 102 into a first position for normal operation of the halogen generator 20 but allows the plate 102 to move to a second position to aid descaling of the cathode plate 102. In the illustrated embodiment, the spring has a spring constant of about 12 pounds/inch, where the normal flow rate through the volute assembly 26 is 1.1 gallons/min. and the flow rate during a cleaning cycle is 1.7 gallons/min. It is appreciated, however, that those skilled in the art will be able to calculate the desired spring constant for a specific application.

In the illustrated embodiment, the terminal post 58 is welded to a disc 112 which, in turn, is welded to the spring 110. The spring 110 provides an electrical connection between the terminal post 58 and the cathode plate 102, as well as allows relative movement of the cathode plate 102 toward the bipolar electrode 30, as discussed below. The spring 110 is welded to the cathode plate 102, about the bore 104. Heliarc welding is the preferred method of connecting the spring 110 to the plate 102 as it causes little deformation of the electrode plate 102. The disc 112 and spring 110 desirably have a diameter of a sufficient size to stably support the terminal post 58 above the plate 102, yet, as understood from FIG. 1, fit within the tubular segment 50 of the inlet port 46.

Figure 4:
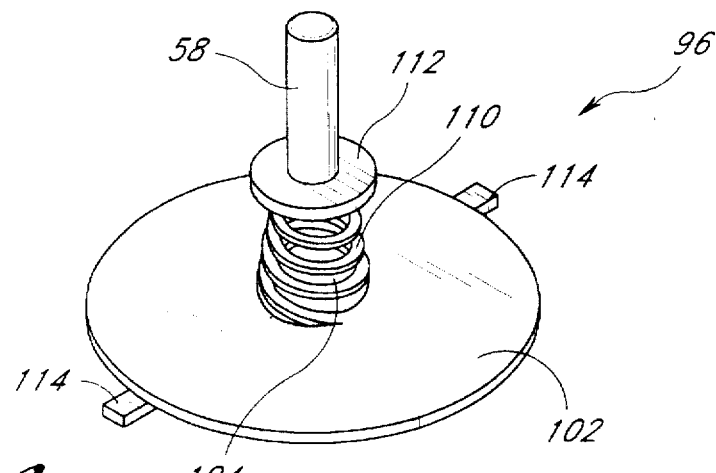
FIG. 4 is a perspective view of an alternative cathode for use with the halogen generator of FIG. 1.

FIG. 4 illustrates another biasing mechanism 110 which can be incorporated with the cathode plate 102. Like reference numerals will be used between like parts of the two cathode embodiments for ease of understanding. As with the cathode illustrated in FIG. 2, the cathode 96 illustrated in FIG. 4 includes a spring 110 which couples the terminal post 58 and the disc 112 to the cathode plate 102. The spring 110, however, is integrally formed from the central region of the plate 102, rather than being a separate helical spring, as in the embodiment illustrated in FIG. 2. The spring 110 desirably is a spiral pattern cut from the center of the cathode plate 102. In this manner, the spring 110 and the bore 104 are simultaneously formed. The cathode plate 102 also includes a pair of outwardly extending tabs 114.

Figure 5:
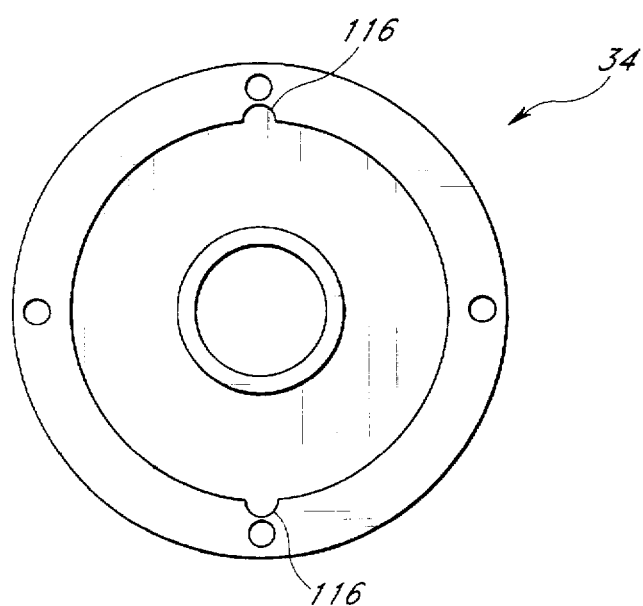
FIG. 5 is a bottom plan view of an alternative volute for use with the cathode of FIG. 4.

The present cathode 96 can be used with a modified volute, which is illustrated in FIG. 5. The volute is identical to the volute 34 described above in connection with FIG. 1, with the addition of a pair of diametrically opposed grooves 116 for receiving the tabs 114 on the cathode plate 102. A stop (not shown) positioned within the grooves 116 limits the axial movement of the tabs 114, and thus the cathode plate 102. The stop may be formed by affixing a small rod within the grooves 116 at a predetermined location. The cathode 102 thus is allowed to "float" to a certain degree within the cell assembly 22 in order to enhance scale removal, as described below. The tabs 114 and the stops, however, prevent the cathode plate 102 from contacting the rotary electrode 30. In the illustrated embodiment, the movement of the cathode plate 102 is such that it may approach within about 0.010 inches to about 0.060 inches with respect to any portion of the rotary electrode 30.

With reference back to FIG. 2, the anode 98 also comprises a circular disc or plate 118 which includes a central bore 120. The bore 120 receives the drive shaft 86 of the motor 28 when the cell assembly 24 is assembled, as described below.

The anode plate 118 is preferably made of titanium or any other suitable metal. The thickness of the anode plate 118 desirably ranges between about 0.020 and about 0.250 inches, and preferably equals about 0.032 inches. The anode plate 118 is coated with precious metal oxides or other materials, such as, for example, a mixture of ruthenium oxide and titanium oxide, to promote the production of halogens through electrolysis.

The anode also includes the terminal post 84 which is electrically connected to the anode plate 118. The terminal post 84 is positioned on the plate 118 so as to extend through the volute plate hole 82 (FIG. 1) when assembled.

The post 84 has a diameter of about 0.125 inches or larger, and is welded to an outer edge of the anode plate 118. It is understood, however, that post 84 can have any of a variety of diameter sizes in order to suit a specific application. As understood from FIG. 1, the terminal post 84 has a sufficient length so as to extend through the hole 82 in the volute plate 36 to expose its outer end.

As seen in FIG. 2, a stationary vane or baffle 122 extends out of the plane of the anode plate 118. The baffle 122 can be either integrally formed with or separately formed from the anode plate 118 and is positioned to extend radially across the plate 118. In the illustrated embodiment, the baffle 122 comprises an integral tab which is bent out of the plane of the plate 118 to lie at an angle transverse to the plane of the plate 118.

FIG. 2 also illustrates the bipolar electrode impeller 30 of the electrolytic cell 24. The bipolar electrode 30 includes a circular disc 124 which preferably is made of titanium or any other suitable material. Various suitable coatings (e.g., precious metal oxides) for promoting the electrolytic production of halogens may be applied to the exterior surfaces of the bipolar electrode body 124. In the illustrated embodiment, the electrode disc 124 is coated with a mixture of ruthenium oxide and titanium oxide.

The electrode 30 is attached to the end of the motor drive shaft 86 so as to rotate between the anode and cathode plates 98, 96. In the illustrated embodiment, the disc 124 includes a central aperture 126 which has a complementary shape to the shape of the stud 90 on the end of the drive shaft 86. That is, the aperture 126 generally has a circular shape with a pair of opposing flats which gives the aperture 126 a generally flatten-elliptical shape.

The nonconductive nut 92 holds the electrode impeller disc 124 onto the end of the drive shaft 86, as described above. It also is understood, however, that the drive shaft 86 alternatively can be welded to the center of the electrode disc 124 either by Tig or inertia welding. Where the electrode disc 124 is welded to the shaft 86, the shaft 86 protrudes outside the volute plate 36 and is coupled with a nonconductive shaft coupling member (not shown) to the drive motor 28 in order to electrically decouple the motor 28 and the electrode impeller 30. (This arrangement is described and illustrated in connection with the halogen generator of FIG. 6). However, because welding can deform the thin titanium plate 124, connection via the nut and threaded shaft is preferred. By avoiding welding, flatness of the electrode 30 can be maintained, the cost is reduced, and serviceability is greatly simplified. Further, with the threaded shaft design, the shaft 86 is cathodically protected from corrosion as it is allowed to contact the underside of the bipolar electrode plate 124 through the shoulder 88 on the shaft 86, but current is not allowed to flow through the shaft to the cathodic side of the electrode plate 124 because of the nonconductive cap nut 92.

As understood from FIG. 2, the electrode plate 124 desirably carries a plurality of small tabs 128 on the side of the plate 124 which faces the cathode 96. The tabs 128 are spaced apart from one another and are positioned at various locations about the disc 124, both in terms of angular and radial positions relative to the center of the plate 124. The tabs 128, however, desirably lie generally tangential to the rotation direction of the electrode plate 124. This orientation of the tabs 124 minimizes the frontal area of the tabs 128 as the tabs 128 rotate with the plate 124 through the water, thereby minimizing the drag the tabs 128 produce on the electrode plate 124.

The tabs 128 help reduce scale buildup on the cathode 96, especially in extremely hard water (e.g., hardness levels of 700 ppm and above). The tabs 128 contact large scale buildup on the cathode plate 102 and effectively chop the scale from the cathode plate 102. The sharp corners of the tabs 128 provide excellent abrading tools, and the tabs 128 are desirably left uncoated to enable oxide formation thereon to increase the abrasive quality of the tabs 128. And, in combination with the discontinuous cathode plate 102 illustrated in FIG. 3, the tabs 128 are particularly useful in removing scale deposits from the fingers 106 of the cathode plate 102.

It should be understood, however, that the electrode impeller 30 can sufficiently descale the cathode 96 without the tabs 128 in water having normal to moderately high hardness levels (i.e., 300 ppm to 700 ppm). The addition of the tabs 128 thus improves the operation of the halogen generator 20 in extremely hard water.

Figure 2A:
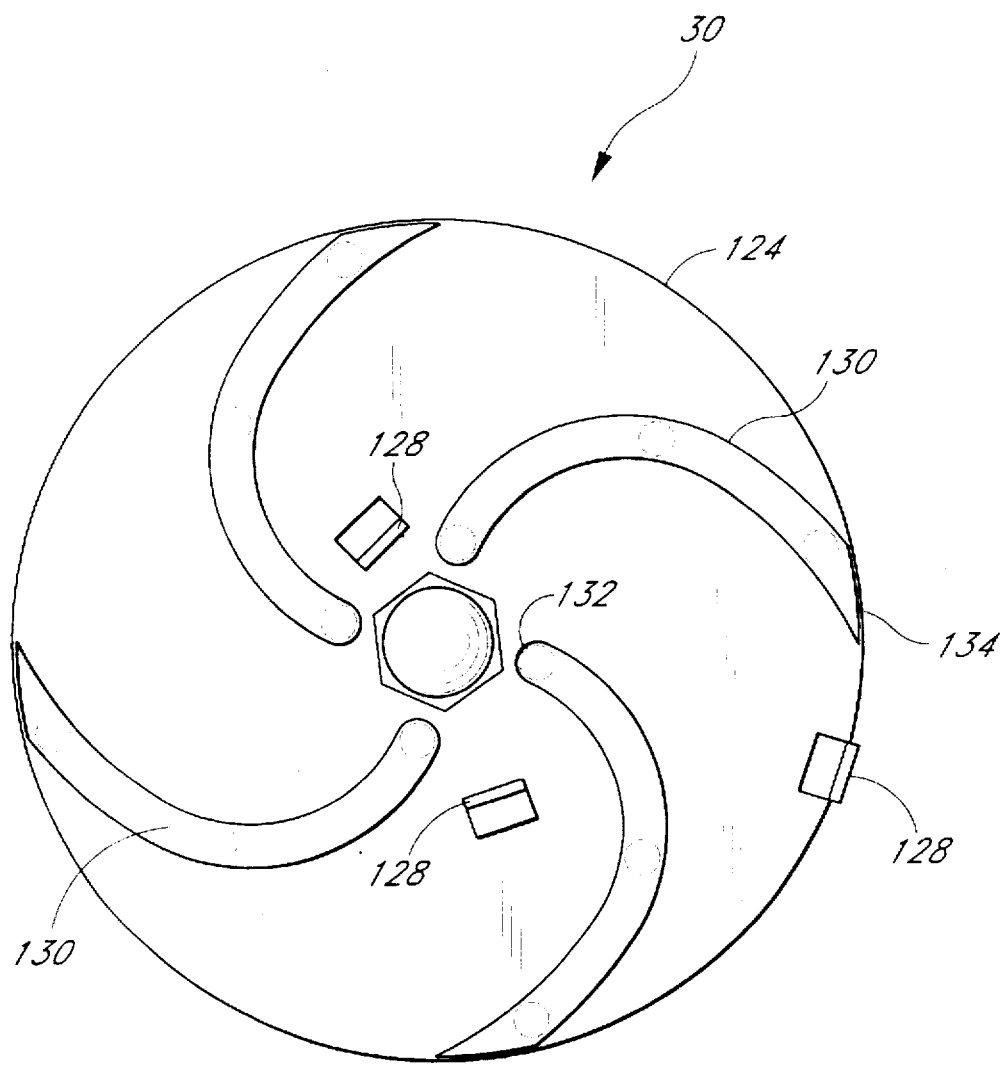
FIG. 2a is a top plan view of the bipolar electrode of FIG. 2.

As best seen in FIG. 2a, the tabs 128 are spaced about the center of the plate 124 at various distances from the plate center. In the illustrated embodiment, the plate 124 includes three tabs 128. The tabs 128 desirably are integrally formed with the plate 124 and are punched out to extend generally normal to the plane of the plate 124; however, it is contemplated that the tabs 128 could be separately formed and attached to the plate 124 in a known manner, such as, by spot welding, cementing, etc. The tabs 128 are positioned away from the center of the plate 124 at positions generally corresponding to a quarter of the radius, a half of the radius, and the full radius of the plate 124. Of course, other numbers and placements of the tabs 128 are possible.

As understood from FIGS. 2 and 2a, the electrode impeller 30 includes a plurality of curvilinear vanes 130 which are carried on and secured to the surface of the electrode plate 124 which faces the cathode 96. The vanes 130 are shaped and positioned so as to induce rotational movement of the water within the central cavity 40 of the volute 34. In the illustrated embodiment, the vanes 130 generally extend from the center of the electrode plate 124 and extend toward the periphery of the plate 124 in a spiral fashion. Each vane 130 includes a rounded inner end 132 and a tapering outer end 134 which generally conforms to the outer circular periphery of the bipolar electrode plate 124. The vanes 130 have a generally rectilinear cross-sections with flat surfaces facing the cathode 96. The vanes 130 desirably are about 0.100 inches thick with sharp edges formed between the sides and the flat surfaces.

The impeller vanes 130 desirably are made from plastic or a resilient material with 20% glass-filled polycarbonate for hardness. The vanes 130 alternatively may be made of a metallic material, such as aluminum, and coated with a nonconductive, wear-resistant coating.

As seen in FIG. 2, the electrode plate 124 desirably includes a plurality of apertures 136 located on a side of the disc 124 that faces the cathode 96 to secure the vanes 130 to the plate 124. The apertures 136 are sized and positioned to receive pins 138 on the underside of a plurality curvilinear impeller vanes 130. In FIG. 2, the vanes 130 are shown exploded to better illustrate the pins 138 and the apertures 136 of the electrode plate 124.

The pins 138 may be press-fit into the apertures 136 and/or may be secured within the aperture 136 by partially deforming the ends of the pin 138 in a fashion similar to a rivet, either by melting or peening. The pins 138 also can be mechanically bonded, chemically bonded, or welded to a collar positioned on the opposite side of the electrode plate 124. It is also contemplated that the vanes 130 can be bonded to the electrode plate 124, in the alternative or in addition to attaching the pins 138 to the plate 124.

Halogen Generator Assembly

With reference to FIGS. 1 and 2, the terminal post 58 of the cathode 96 is inserted through the tubular segment 50 and the plug 56 to expose an outer end of the of the terminal post 58. A conventional retainer ring or like fastener (not shown) snaps onto the exposed end of the terminal post 58 to couple the cathode with the volute 34. The terminal post 58 may also be bonded to the plug 56 to secure the cathode 96 to the volute 34. A fluid seal is provided within the cathode plug 56 with, for example, an O-ring (not shown).

In this position, the cathode plate 102 desirably rest flush against the inner wall of the volute 34 with its central hole 104 coaxially positioned relative to the opening of the inlet port 46 (i.e., the tubular segment 50). The disc 112 and spring 110 of the cathode 96 are housed within the tubular segment 50 of the inlet port 46.

As understood from FIG. 1, a conductor 140 leading from a negative terminal 142 of the controller 32 electrically connects to the outer end of the terminal post 58 to supply electricity to the cathode plate 102. The controller 32 and its operation will be discussed below.

The motor 28 is attached to the volute plate 36 by threading the elongated bolts 94, which pass through the motor body, into the threaded inserts 66 positioned on the outer side of the volute plate 36. So attached, the motor shaft 86 extends through the center hole 70 of the volute plate 36. A conventional mechanical pump seal 74, such as the type available commercially from Cyclam of France, is seated in the counterbore 72 on the inner side of the volute plate 36. The seal 74 creates a fluid-tight seal between the volute plate 36 and the motor shaft 86, while producing little friction or interference with the motor shaft 86 as it rotates.

The anode plate 118 is seated on the volute plate 36 with its terminal post 84 extending through the corresponding hole 82 in the volute plate 36. A conventional retainer ring or like fastener (not shown) snaps onto an exposed end of the terminal post 84 to secure the anode 98 to the volute plate 36. The volute plate hole 82 includes a fluid seal, such as an O-ring (not shown), to prevent fluid from exiting the cell through the hole 82. A conductor 144 leading from a positive terminal 146 of the controller 32 electrically contacts the outer end of the terminal post 84 to supply electricity to the anode plate 118.

The bipolar electrode plate 124 is attached to the end of the shaft 86 by the nonconductive nut 92. Specifically, the plate 124 is inserted over a portion of the shaft 86 to rest on the shoulder 88 of the stud 90 of the shaft 86. The corresponding shapes of the aperture 126 in the electrode plate 124 and the shaft stud 90 key these components 86, 124 together to cause the electrode plate 124 to rotate with the motor shaft 86. The nonconductive nut 92 holds the electrode plate 124 on the end of the shaft 86. In this manner, the shaft 86 generally is electrically isolated from the other components in the electrical system. Fortunately, the motor armature usually is already insulated.

The volute plate 36 is placed on the end of the volute 34 with the electrode impeller 30 and anode 98 being inserted into the interior cavity of the volute 34. In this position, the anode plate 118, electrode plate 124 and cathode plate 102 lie generally parallel to one another. Bolts (not shown), passed through the corresponding bolt holes 44, 80 in the lugs 42 of the volute 34 and in the outer flange 78 of the volute plate 36, cooperate with nuts (not shown) to hold the volute 34 and volute plate 36 together.

When assembled, the electrode plate 124 desirably is equally distanced from the cathode plate 102 and the anode plate 118. The gap spacings between the electrode plate 124 and the anode plate 118 and between the electrode plate 124 and the cathode plate 102 desirably is sufficient to promote efficient electrolysis. That is, the gap spacings are set so as to maximize the efficiency of the electrolytic cell 24. In the illustrated embodiment, the gap spacings range between about 0.15 and about 0.75 inches, and preferably equal about 0.15 inches. The gap spacings, of course, can be selected in order to suit a specific application.

The spacing between the outer surface of the vanes 130 on the rotary electrode 30 and the cathode plate 102 importantly also are tightly controlled, especially for operation in hard water (i.e., water having a hardness of greater than 700 ppm). In the illustrated embodiment, the outer surfaces of the vanes 130 are spaced from the cathode plate 102 by a distance which preferably ranges between about 0.03 and about 0.1 inches, more preferably ranges between about 0.03 and about 0.05 inches, and most preferably equals about 0.03 inches. Although the vanes 130 are placed in close proximity to the cathode plate 102, the vanes 130 do not contact the cathode 96 when the electrode plate 124 rotates.

The close spacing between the vanes 130 and the cathode plate 102 prevents scale buildup on the cathode 96. As the bipolar electrode 30 rotates, the fluid velocity created at the surface of the cathode plate 102 by the vanes 130 substantially prevents scale from building up. Scale may temporarily form on the surface of the cathode plate 102, but the velocity of the water within the cell 24, and in particular, between the vanes 130 and the surface of the cathode plate 102, breaks the scale away from the plate surface 102. Water flow through the cell 24, which is produced by the vanes 130, carries the loose scale particles through the outlet port 48 of the volute assembly 26 to flush the scale particles from the cell assembly 22. In addition, the vanes 130 will mechanically knock-off any scale deposits in excess of the gap spacing between the vanes 130 and the cathode plate 102.

From surface friction, the flat bottom surface of the bipolar electrode 30 also creates some rotational velocity of the water between the bipolar electrode 30 and the anode 98. The baffle 122, however, substantially inhibits water from rotating close to the surface of the anode 98. This helps prevent erosion of the anode 98. The baffle 122 also inhibits the formation of substantial scale deposits on the underside of the bipolar electrode 30 which functions as a cathode. Like the vanes 130 on the opposite side of the rotary electrode 30, the baffle 122 lies close to the underside of the electrode 30. The close spacing between the baffle 122 and the electrode plate 124 causes a rapid change of water velocity between the rotating electrode 30 and the stationary baffle 122. In the illustrated embodiment, the outer surface of the baffle 122 is spaced from the rotary electrode 30 by a distance which preferably ranges between about 0.03 and about 0.1 inches, more preferably ranges between about 0.03 and about 0.05 inches, and most preferably equals about 0.03 inches. Although the baffle 122 is placed in close proximity to the electrode plate 124, the baffle 122 does not contact the electrode plate 124 as the plate rotates 124.

This small gap in which the water velocity changes from the rotational speed of the electrode 30 to zero velocity at the stationary baffle 122 greatly prevents the development of scale buildup on the underside of the electrode 30, much like the action between the vanes 130 and cathode plate 102. Scale may temporarily form on the cathodic surface of the electrode 30, but the velocity of the water within the cell 24, and in particular, between the baffle 122 and the cathodic surface of the electrode 30, breaks the scale away to be flushed out of the cell assembly 22. In addition, scale buildup on the cathodic surface of the electrode 30 in excess of the gap spacing between the baffle 122 and the electrode plate 124 is knocked off by mechanical contact with the baffle 122.

Operation of the Halogen Generator

When the controller 32 energizes the halogen generator 20, current flows between the negative terminal 142 and positive terminal 146 of the controller 32. Electrical current flows through the cathode 96, through the electrolytic solution within the cell 24 and to the anodic surface of the bipolar electrode 30. The electrical current also flows through the bipolar electrode 30 to the cathodic surface of the electrode 30 and through the electrolytic solution within the cell 24 to the anode 98. Positive and negative charges are induced on the cathodic and anodic surfaces of the bipolar electrode 30, respectively. The bipolar electrode 30 thus acts as an anode on its surface facing the stationary cathode 96 and acts as a cathode on the surface facing the stationary anode 98. The controller 32 desirably supplies about 2.4 amps of current to the anode 98 and cathode 96, giving the anode and cathode a current density of about 0.08 amps/cm$^2$.

The electrical potential imposed between the electrodes of the cell 24 electrolytically causes the dilute halide in the water to form pH neutral halogen, oxygen, and hydrogen, among other compounds. For instance, when the water contains a dilute solution of sodium bromide, the resultant electrolytic process produces hypobromous acid and hydroxide ions, hydrogen, as well as nascent oxygen. Hypobromous acid and sodium hydroxide rapidly convert to form bromide, a water sanitizing agent.

The controller 32 also activates the motor 28 of the halogen generator 20 when the cell 24 is energized, as discussed below. The motor 28 drives the electrode impeller 30 in a desired direction to produce a flow of water through the cell assembly 22. The vanes 130 impart a rotational velocity vector to the water as the vanes 130 rotate with the electrode impeller 30 through the water. Rotation of the water thus creates a radially outward flow which tends to force the water from the outlet 48 of the volute 34.

Water initially flows through the central bore 104 of the cathode 96, perpendicularly toward the center of the bipolar electrode 30. In the volute 34, water flows on both sides of the bipolar electrode 30, but the rotation of the water relative to the anode 98 is hindered by the presence of the baffle 122.

As mentioned above, the relative water velocity between the lower surface, or cathode side, of the bipolar electrode 30 and the baffle 122 is relatively great, tending to inhibit scale formation on the cathode side of the bipolar electrode 30. Conversely, water flow adjacent the anode 98 is minimized by the baffle 122 thus extending the life of the anode 98 by reducing frictional erosion from water flow. The baffle 122 is disposed at a slight radial angle from the outer edge of the anode plate 118 toward the center and also has a generally rectilinear cross-section to present sharp edges for knocking excessive scale buildup off of the lower surface of the bipolar electrode 30.

The controller 32 also desirably causes the motor 28 to periodically reverse the rotational direction of the impeller 30 during its operational cycle. Rapid reversals of the rotational direction of the bipolar electrode 30 have been found to causes scale deposits within the cell 24 to be quickly removed. The rapid reversals in the bipolar electrode's rotational direction create rapid water flow reversals relative to the stationary cathode 96. These water flow reversals also are present relative to the lower surface of the bipolar electrode 30 by virtue of the stationary baffle 122. Such flow reversals generate turbulence adjacent the cathodic surfaces within the cell 24 to swirl and knock off scale growth before it can affect the efficiency of the cell 24.

In an alternative mode of operation, the bipolar electrode 30 undergoes rapid rotational direction reversals several times at regular intervals as a maintenance step. For instance, the controller 32 initiates a scale removal sequence once every six hours of cell operation. During each scale removal sequence, the controller 32 causes the motor 28 to rotate the electrode impeller 30 in one direction for 15 seconds, then reversed to rotate the electrode impeller 30 in an opposite direction for another 15 seconds. This reversal is repeated six times during the scale removal sequence.

The controller 32 can alternatively initiate the scale removal sequence once scale deposits reach an undesirable level. This can be determined in a number of ways, the simplest of which is by sampling of the cell voltage which increases as a function of the resistance to current flow from scale deposits. For instance, with a cell 24 which operates efficiently below a predetermined voltage (e.g., 5 volts), the controller 32 initiates the scale removal sequence when the voltage exceeds the predetermined value. The cell cleaning process will be described in more detail below in connection with the controller 32 and its operational sequences.

The ability of the cathode plate 102 to move toward the rotary electrode 30 also enhances scale removal. With reference to FIG. 2, the spring 110 allows the cathode plate 102 to be displaced in an axial direction within the cell 24. The cathode plate 102 is mounted at an optimum spacing with respect to the bipolar electrode 30 for efficient electrolysis with the spring 110 in a relaxed, undeflected state. As the pressure within the cell 24 changes, the cathode plate 102 is displaced toward the electrode 30.

For this purpose, the motor 28 drives the electrode impeller 30 at a high rate of speed to generate a lower pressure at its surface facing the cathode 96, thus urging the cathode plate 102 toward the bipolar electrode 30 and against the bias of the spring 110. Excessive scale buildup on the cathode plate 102 will contact the vanes 130 or tabs 128, thus cleaning the cell 24 automatically. As the motor 28 slows down, the cathode plate 102 returns to the optimum spacing from the electrode 30 for efficient electrolysis. This high speed cleaning cycle can be easily accomplished with a minimum of electric circuitry by simply turning off the power to the motor 28 (1 amp @10.5 VDC constant voltage) and switching the output with a relay from the cell 24 (2.4 amps constant current, maximum 17 V) to the motor 28.

Other means for axially displacing the cathode 96 also are contemplated. For instance, the cathode 96 may be coupled to a solenoid (not shown) which positively displaces the cathode 96 upon receiving an actuation signal. Thus, the cathode movement and associated scale removal are accomplished independently of the speed of the motor 28. Alternatively, the solenoid may be replaced with a shape memory alloy which expands or contracts in response to electrical current changes. One example of such a material is Flexinol™. This embodiment would require much less current than a conventional solenoid. In another embodiment, an external spring can be used in place of the internal spring 110 illustrated in FIG. 2. An external spring (not shown) may be provided between a nut attached to the exposed end of the terminal post 58 and the volute inlet plug 56. And in other embodiments, mechanical displacement or magnetic attraction devices may be substituted for the internal spring, all such devices enabling the axial movement of the cathode plate 102.

Additional Halogen Generator Embodiments

Figure 6:
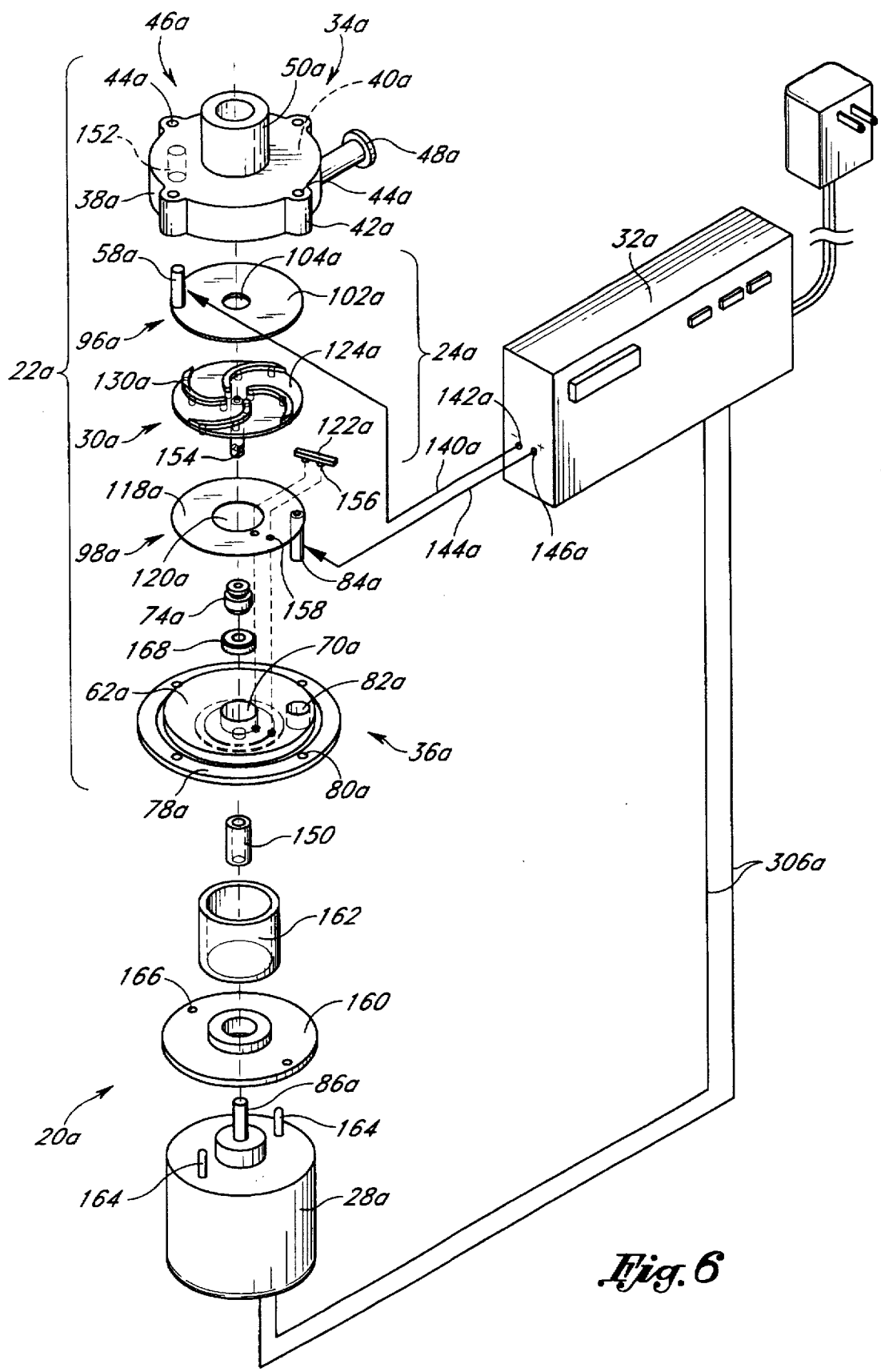
FIG. 6 is an exploded perspective view of a halogen generator configured in accordance with another preferred embodiment of the present invention.

FIG. 6 illustrates a halogen generator 20a which is configured in accordance with another preferred embodiment of the present invention. Where appropriate, like reference numerals with an "a" suffix have been used to indicate like components between the two embodiments.

The generator 20a is in most respects similar to the generator 20 described above and illustrated in FIG. 1. The present generator 20a, however, incorporates a new volute design 34a, a stationary cathode 96a and an insulator coupling 150 between the motor shaft 86a and the electrode plate 124a. These differences in the present halogen generator 20a will be discussed in detail below. A further description of the balance components of the present halogen generator 20a which are identical to those described above, however, is not believed necessary for an understanding of the present embodiment of the halogen generator.

With reference to FIG. 6, the volute 34a includes a generally cup-shaped housing 38a with a central cavity 40a having a cylindrical shape. The volute 34a also includes a plurality of lugs 42a which extend outwardly from the housing 38a. A bolt hole 44a passes through each lug 42a.

As understood from FIG. 6, the volute 34a includes an inlet port 46a and an outlet port 48a. The inlet port 46a is configured to direct water flow into the central cavity 40a at the center of the cavity 40a. The outlet port 48a is positioned on the peripheral edge of the housing 38a, generally tangentially to the cylindrical central cavity 40a of the housing 38a. This position of the outlet port 48a encourages the conversion of water velocity to pressure, as known in the art.

In the illustrated embodiment, the volute water inlet 46a includes a tubular segment 50a which extends axially from the center of the volute 34a. A water inlet conduit (not shown), which communicates with the water feature (e.g., spa circulation system), is attached to the tubular segment 50a to supply water to cell assembly 22a. The tubular segment 50a directs the flow of water into the cylindrically shaped central cavity 40a at the center of the cavity 40a and in a direction along the axis of the cavity 40a.

The volute 34a also includes an access hole 152 in the housing 38a at a position proximate to the side wall of the central cavity 40a. The hole 152 is sized to receive a terminal post 58a of the cathode plate 102a, as described below. An O-ring seal, or other similar expedient, is provided within the access hole 152 to seal around the terminal post 58a.

The cathode 96a includes a disc-shaped plate 102a having a central water inlet bore 104a, and the offset terminal post 58a. The post 58a extends through an access hole 152 of the present volute 34a. By offsetting the terminal post 58a, the central inlet port 46a may be enlarged in comparison to the halogen generator of FIG. 1 which has a central terminal post 58. The enlarged port size helps prevent excess scale from plugging the port 46a and restricting flow.

The cathode plate 102a is sized and configured in accordance with description given in connection with the above embodiment. The cathode plate 102a also is constructed of 316L stainless steel or any other suitable metal, such as, for example, copper or titanium.

In the present halogen generator 20a, the cathode 96a is stationary, both in the rotational and axial directions. Although it has been found that axially displacing the cathode with respect to the bipolar electrode enhances scale removal, it has also been discovered that rapid reversals of the bipolar electrode can serve to rapidly clean the cell. The present embodiment thus illustrates that these features can be used either together or apart.

The bipolar electrode 30a is similar to the bipolar electrode 30 described above, with the absence of the tabs 128 and the presence of a permanently attached shaft 154. The drive shaft 154 may be welded to the titanium electrode 30, as shown in FIG. 6. In the welded embodiment, a shaft 154, which is about 0.125 inches or larger in diameter, with about 0.25 inches preferred, can be welded to the center of the electrode 30 either by Tig welding or inertia welding before the electrode 30 is coated. The shaft 154 then protrudes outside the volute plate 36a and is coupled with the non-conductive shaft coupling member 150 to the drive motor 28.

There are several different configurations of rotary electrodes 30a within the cell 24a, as will be explained in detail below, all including a downwardly depending shaft 154 surrounded by a bearing 168 and pump seal 74a disposed within the bore 70a of the volute plate 36a. The rotating electrode 30a can of course be driven by alternative means obviating the need for a rotational seal, such as by an external rotating magnet drive.

The anode 98a also is similar to the one described above with the exception of a removable baffle 122a in place of an integral baffle 122. The baffle 122a is provided with a pair of pins 156 which fit within apertures 158 in the electrode plate 118a.

As seen in FIG. 6, a drive motor 28a is attached to the volute plate 36a via an extension bracket 160 and an extension tube 162, these components being cemented together or detachably coupled in a conventional manner. The drive motor 28a includes a pair of anti-rotation pins 164 which mate with apertures 166 in the extension bracket 160. The drive shaft 86a of the motor 28a is sized to fit in one end of a shaft coupling member 150, which has an opposite end that is sized to receive the downwardly depending shaft 154 on the rotary electrode 30a.

The present halogen generator 20a is assembled in substantially the same way as the halogen generator 20 of FIG. 1. The present halogen generator 20a also operates in a substantially identical manner to that of the halogen generator 20 of FIG. 1. The only difference in the operation of the two halogen generators is that the present halogen generator 20a does not include a high speed cleaning cycle where the gap spacing between the cathode 96a and the rotary electrode 30a is decreased. Otherwise, the operations are identical, and further description of the assembly and the operation is not believed necessary for an understanding of the present halogen generator 20a.

FIGS. 7 and 8 illustrate additional preferred embodiments of electrolytic cell configurations which can be used with the halogen generator of FIG. 6. The embodiments illustrated by these figures, however, are otherwise identical to the halogen generator described above. Accordingly, the foregoing description of the halogen generator should be understood as applying equally to the embodiments of FIGS. 7 and 8, unless specified to the contrary.

FIG. 7 illustrates a electrolytic cell configuration in which a rotating anode 170 is positioned between two stationary cathodes 172, 174. Where appropriate, like reference numerals with a "b" suffix have been used to indicate like components between the two embodiments of the electrolytic cell.

The cathodes 172, 174 include disc-shaped plates 102b and electrode terminal posts 58b, 175, respectively. The upper cathode 172 includes a central bore 104b for passage of input water flow. The lower cathode includes a central bore 176 through which the rotating shaft 154b of the anode 170 extends.

The rotating anode 170 includes a disc-shaped plate 178 which carries a plurality of vanes 130b. The vanes 130b are mounted on both sides of the anode 170 in order to circulate water flow adjacent the underside of the upper cathode 172 and the upper surface of the lower cathode 174. In this manner, scaling is greatly reduced on the cathode surfaces 102b in a manner similar to that described above. Furthermore, water flow directly adjacent the opposite surfaces of the rotating anode 170 is minimized due to the upstanding vanes 130b, thus reducing erosion of the anode 170.

The anode plate 178 also includes a plurality of tabs 128b to promote scale removal on the opposing cathode surfaces 102b. Although FIG. 7 illustrates the tabs 128b extending only from the top side of the anode plate 178, it should be understood that the tabs 128 preferably extend from both sides of the anode plate 178.

The anode 170 and the two cathodes 172, 174 are arranged within the cell 24b assembly in a manner identical to that described above in connection with the bipolar electrolytic cell configuration of FIG. 6. That is, the cathodes 172, 174 are rigidly affixed to the volute 34b and volute plate 36b within the central cavity 40b. The rotary anode 170 is supported and driven by the drive shaft 154b. The anode 170 is placed between the cathode plates 102b at the desired gap spacings recited above.

As understood from FIG. 7, the anode 170 is energized via a conventional brush connection or through the use of a spring-loaded conductor 180. The conductor 180 is mounted within a housing 182 and is biased by a spring 184 against the shaft 154b. The housing 182 is preferably affixed with respect to the volute plate 36a. The conductor 180 is electrically connected with the positive terminal 146b of the controller 32b. A portion of the shaft 154b may be made of copper and inertia welded to the titanium shaft to provide electrical contact.

FIG. 8 illustrates an additional electrolytic cell configuration for use with the halogen generator illustrated in FIG. 6. Where appropriate, like reference numerals with a "c" suffix have been used to indicate like components between the two embodiments of the electrolytic cell.

In this embodiment, a rotating anode 170c faces a single stationary cathode 172c within the cell assembly 22c. The cathode 172c comprises a disc-shaped plate 102c and an upstanding electrode terminal post 58c which extends through the volute 34a. The cathode terminal post 58c is electrically connected with the negative terminal 142c of the controller 32c. The cathode plate 102c also includes a central bore 104c for passage of water into the electrolytic cell 24c.

The rotating anode 170c includes a disc-shaped plate 178c which carries a plurality of vanes 130c attached to the top surface of the plate 178c. The vanes 130c are shaped to generate rotational water flow adjacent the underside of the cathode plate 102c. In this manner, scaling is greatly reduced on the lower cathode surface 102c, as described above. Furthermore, water flow directly adjacent the opposite surface of the rotating anode 170c is minimized due to the upstanding vanes 130c, thereby reducing erosion of the anode 170c.

The anode plate 178c also includes a plurality of tabs 128c which extend from the anode plate 178c toward the cathode plate 102c. The tabs 128c enhances scale removal as previously described.

A shaft 154c depending downward from the anode 170c makes electrical connection with a conductor 180c. The conductor 180c is mounted within a housing 182c and is biased by spring 184c against the shaft 154c. The conductor 180c is electrically connected to the positive terminal 146c of the controller 32c. The housing 182c is preferably affixed relative to the volute plate 36a. The biased contact between the conductor 180c and the shaft 154c electrically connects the shaft 154c to the positive terminal 146c of the controller 32c while allowing the shaft 154c to rotate.

It also is contemplated that the present halogen generator may be modified to utilize a nonconducting rotating impeller (not illustrated) in place of the bipolar electrode 30 shown in FIG. 1. In most respects, the impeller is similar to the electrode of the halogen generator of FIG. 1, except that a plurality of apertures are formed through the disc shaped body. The apertures allow electrical current to flow via the conductive fluid from the anode to the cathode. The nonconducting impeller thus provides all of the advantageous scale cleaning and water circulating benefits of the bipolar electrode described previously. Indeed, a conventional pump may be retrofit to operate as the cell with the addition of two electrodes and a slight modification of the impeller; namely, apertures would be formed in the impeller. Such a retrofit cell could function with or without polarity reversal due to the beneficial scale removal characteristics of the impeller vanes.

Application of Halogen Generator to Conventional Spa System

Figure 9A:
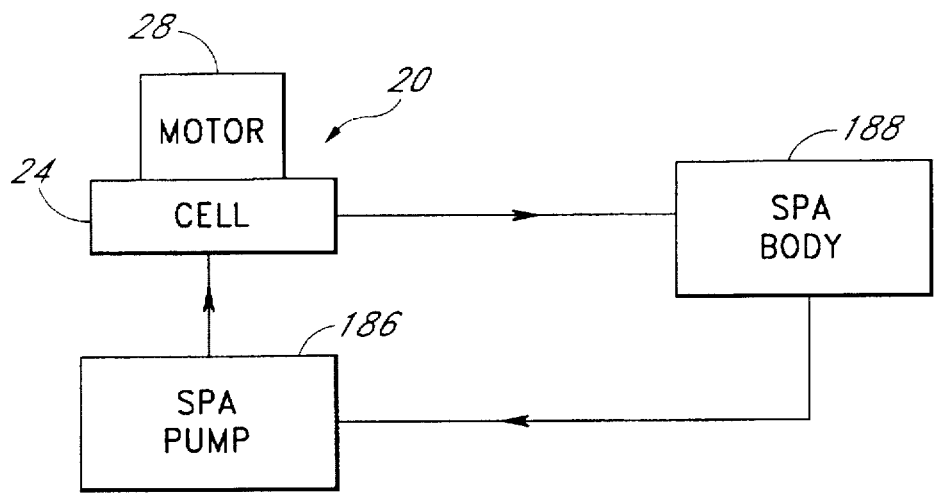
FIGS. 9a through 9d are block diagrams of alternative installation configurations of the present halogen generator into an existing spa system.

The present halogen generator 20 can be incorporated into a spa system in several ways. FIGS. 9a through 9d schematically illustrate several possible layouts of the halogen generator 20 in a conventional spa system. FIGS. 9a and 9c illustrate the halogen generator 20 incorporated (i.e., retrofitted) into the conventional water circulation system of the spa system. FIG. 9c illustrates the halogen generator 20 disposed within its own dedicated line.

In the in-line configuration illustrated in FIG. 9a, the halogen generator 20, including the cell 24 and motor 28, is placed in series with a circulation or spa pump 186. The conventional pump 186 may be a small 24 hour pump to recirculate the water for heating and filtering purposes. The generator 20 thus may be operated 24 hours a day. The spa system may also employ one or more booster pumps which drive the spa jets or employ a two-speed circulation pump. In the latter case, the circulation pump, set on a low speed, filters and heats the spa water during a preset period (e.g., four hours per day). When the spa is in use, the circulation pump is set to a high speed to drive the spa jets. Other systems may employ two or more speed pumps which are placed in series. For simplicity, FIGS. 9a and 9b model these various convention pump systems as a single block.

With the in-line configurations illustrated in FIG. 9a, the halogen generator 20 is generally run only when the circulation pump 186 is on, although in some cases only the motor 28 of the generator 20 may be energized to produce a water flow through the cell assembly 24. In this regard, the generator 20 may even replace the circulation pump and function as both the conventional circulation device with the cell de-energized, and periodically as a halogen generator with the cell energized.

Figure 10:
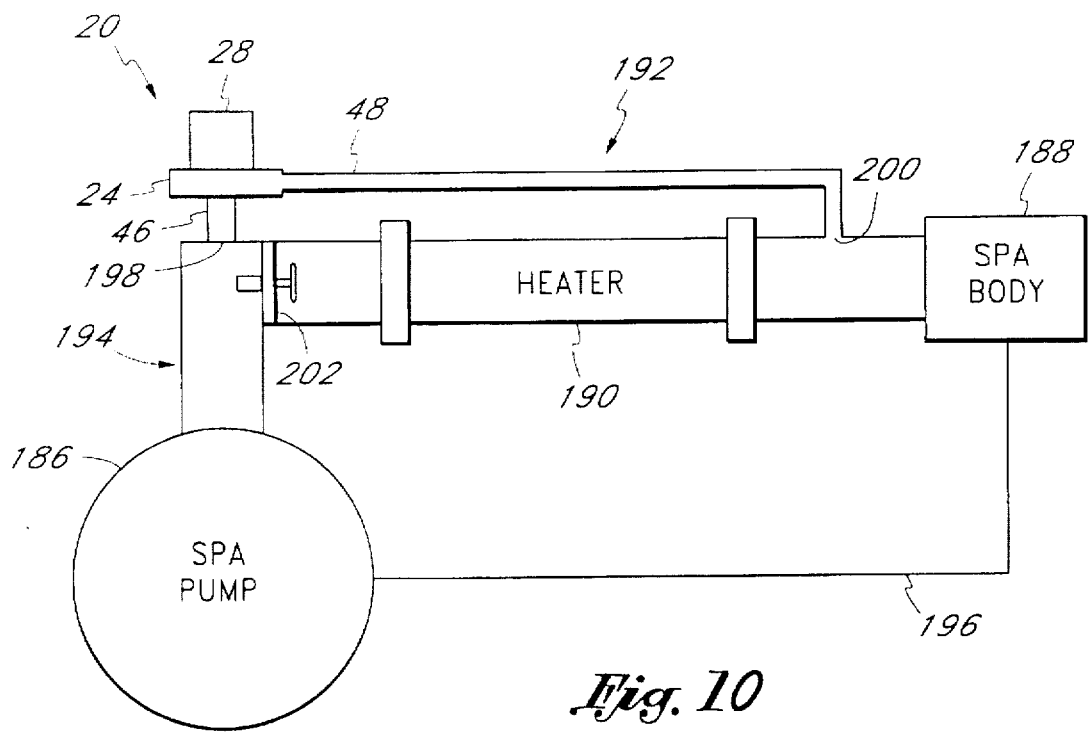
FIG. 10 is a schematic representation of a spa water circulation system utilizing the present spa halogen generator.
Figure 11:
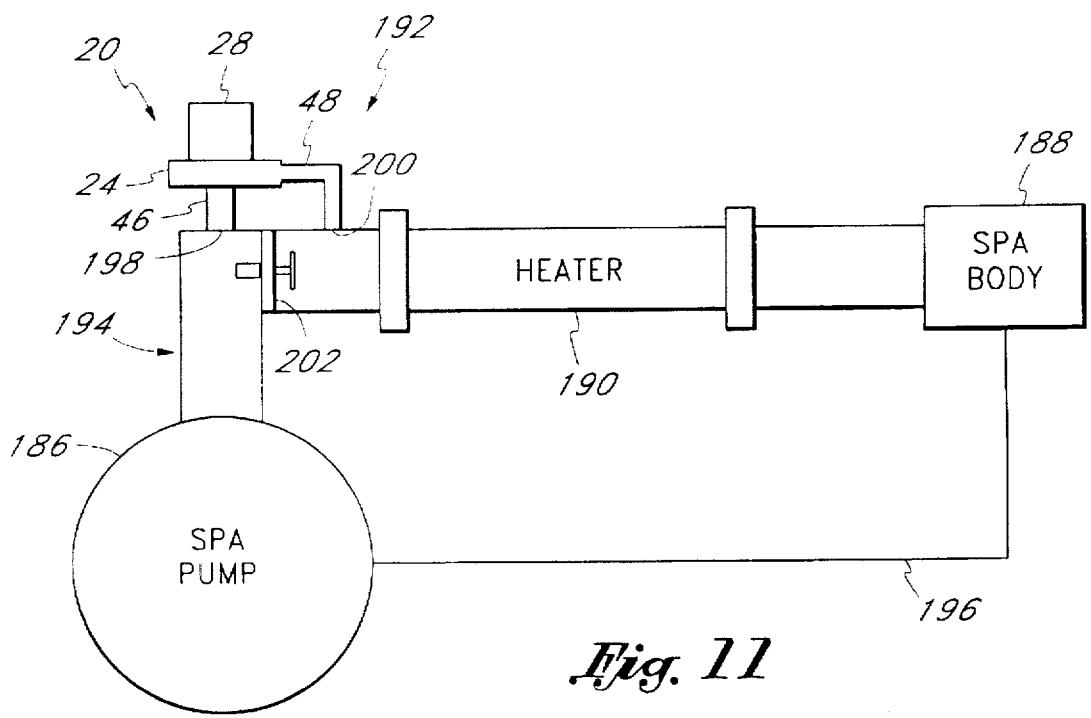
FIG. 11 is a schematic representation of an alternative configuration of the water circulation system of a spa incorporating the present spa halogen generator.

FIGS. 10 and 11 illustrate two alternative arrangements for coupling the halogen generator 20 with a conventional water circulation system, downstream of the spa pump 186. FIG. 10 illustrates an arrangement where the halogen generator 20 is positioned in parallel to a spa heater 190, and FIG. 11 illustrates an arrangement where the halogen generator 20 is positioned in series with the spa heater 190.

In FIGS. 10 and 11, the cell 24 is shown installed in a bypass line 192 fluidicly connected in parallel with the main circulation line 194 between the spa pump 186 and the spa body or container 188. A return line 196 fluidicly connects the spa body 188 to the spa pump 186. The heater 190 is typically positioned in series with the main circulation line 194. The bypass line 192 includes an inlet opening 198 and an outlet opening 200 which fluidicly connect the bypass line 192 with the main circulation line 194. Thus, the action of the impeller 30 within the cell 24 draws water through the inlet opening 198 and through the central water inlet 46 of the halogen generator 20. Water is discharged through the water outlet 48 of the halogen generator 20 to travel along the bypass line 192 and exit the bypass line 192 at the outlet opening 200. In FIG. 10 the outlet opening 200 connects to the main circulation line 194 at a position downstream of the heater 190. In FIG. 11, the outlet opening 200 connects to the main circulation line 194 at a location upstream of the heater 190.

In both of the system configurations illustrated by FIGS. 10 and 11, a bypass check valve 202 is installed in the circulation line 194 between the inlet opening 198 and the outlet opening 200. This bypass check valve 202 allows the cell to operate when the pump 186 drives the spa jets, as well as prevents water from flowing back toward the spa pump 186 (i.e., "short circuiting" the plumbing system).

When the spa circulation system is operated, the spa pump 186 and the halogen generator 20 together create a water flow through inlet opening 198 and into the inlet port 46 of the halogen generator 20. When the check valve 202 is closed, all of the water in the circulation system flows through the halogen generator 20. But when the pressure at the inlet opening 198 to the bypass line 192 reaches a preset level, the check valve 202 open to allow a portion of the water flow through the circulation system to bypass the halogen generator 20 and flow directly into the main circulation line 194. For instance, when the spa pump 186 is at a high speed, water flows through the bypass check valve 202 and through the heater 190 in parallel to water flowing through the bypass line 192.

When the spa circulation system is not operated (i.e., the spa pump 186 is not activated), the bypass check valve 202 remains closed, preventing flow along the main circulation line 194 in the direction from the outlet opening 200 to the inlet opening 198. All of the water flow through the circulation system flows through the halogen generator 20, which generates the water flow.

Figure 12A:
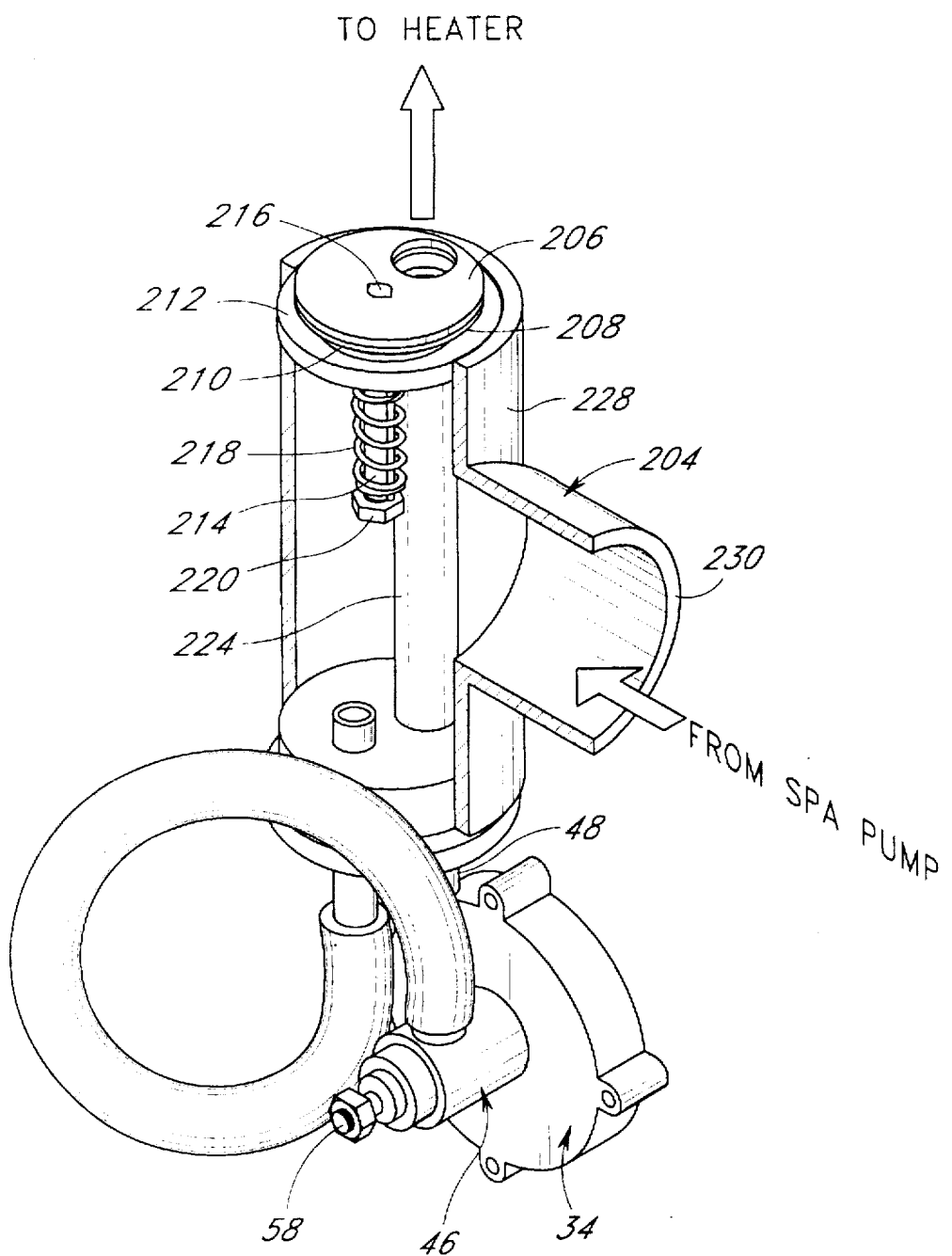
FIG. 12a is a sectional perspective view of an assembled T-connection fitting between the halogen generator, spa pump and heater of the spa system.
Figure 12B:
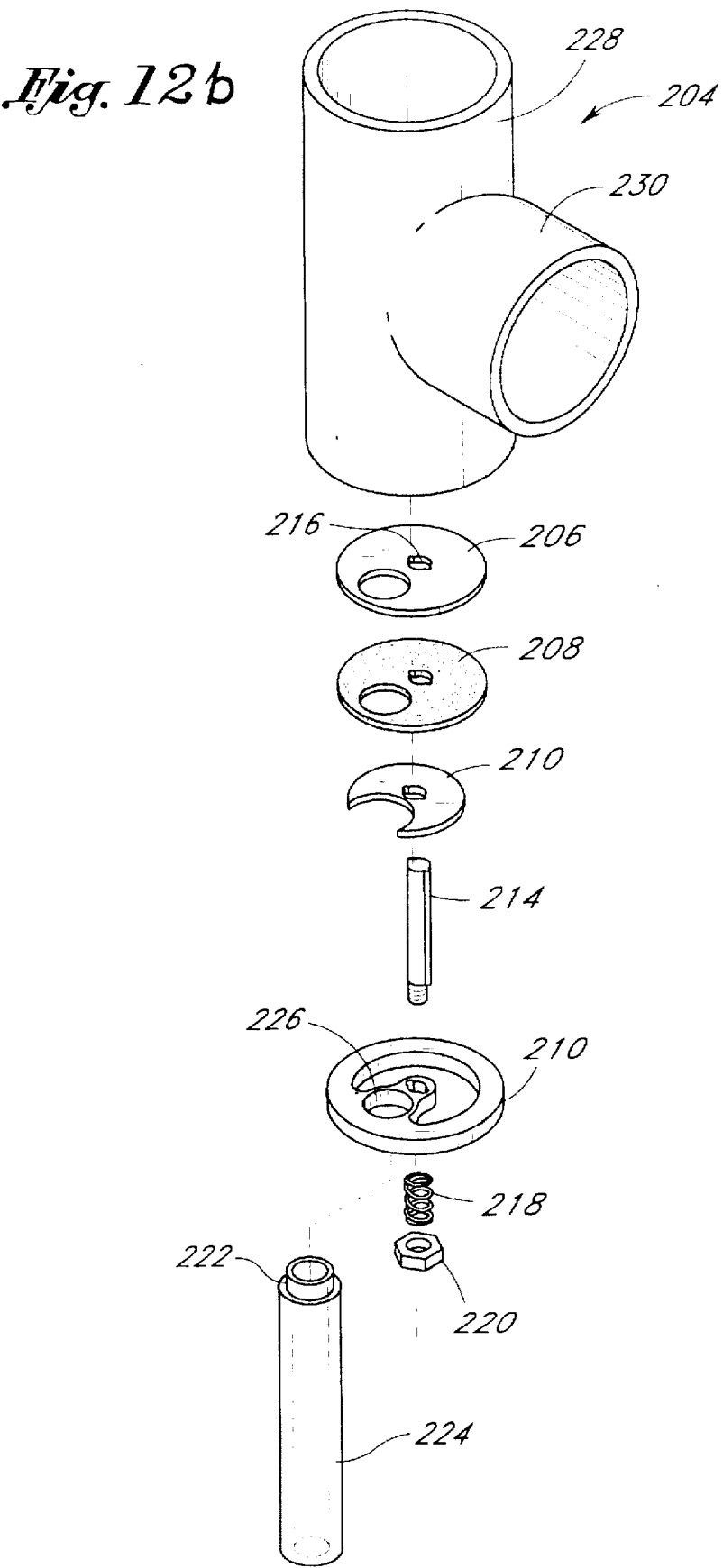

FIGS. 12a and 12b illustrate a preferred embodiment of the present in-line bypass check valve 202. In the illustrated embodiment, the check valve 202 is housed within a standard T-fitting 204. As seen in FIGS. 12a and 12b, the check valve 202 comprises a piston 206 made of ABS or other suitable polymer, a rubber gasket 208 and a retainer 210 made of ABS or other suitably polymer. The rubber gasket 208 is preferably constructed of a suitable elastomer such as neoprene or EPDM. The piston 206, rubber gasket 208, and retainer 210 can be cemented or bolted together to retain the gasket 210 and seal it against a bypass body 212 when in the closed state (i.e., when the spa pump 186 is off and/or operated at a low speed). A piston shaft 214 extends through a matching hole 216 in the bypass body 212 and a spring 218 slides over the shaft 214 and is secured thereon by a nut 220 or by solvent cementing. The spring 218 biases the bypass check valve piston 206 against the gasket 208 (i.e., biases the check valve 202 closed) to prevent water flow through the opening in the bypass body 212, but allows the piston 206 to open fully at pressures greater than a preset limit. In the illustrated embodiment, the check valve 202 opens at pressures equal to or above about 0.5 psi. Of course, when the valve 202 is closed, the bypass check valve 202 prevents backflow in the direction from the outlet opening 200 to the inlet opening 198 of the bypass line 192.

A port nozzle 222, typically a ⅛ inch schedule 80 PVC nipple, at the end of a tubular member 224 is solvent cemented into an aperture 226 in the bypass body 212. Corresponding apertures are provided in the piston 206, gasket 208 and retainer 210. The bypass body 212, in turn, is glued into an outlet port 228 on the tee fitting 204 leading to the heater 190. Although not illustrated, the bypass body 212 also may be solvent cemented into a wall fitting insert for direct coupling to the spa body 188.

The bypass body 210 and piston assembly reside in the tee fitting 204 at a point downstream from a spa pump inlet port 230 in the tee fitting 204. This allows it to both restrict flow while the spa pump 186 is operating and to prevent flow between the bypass line outlet 200 and inlet opening 198 (see FIGS. 10 and 11). When the spa pump 186 is off, the halogen generator draws water from the inlet side of the piston 206 and accelerates it through the port nozzle 222 where it continues through the piston assembly while the valve 202 is closed.

Figure 9B:
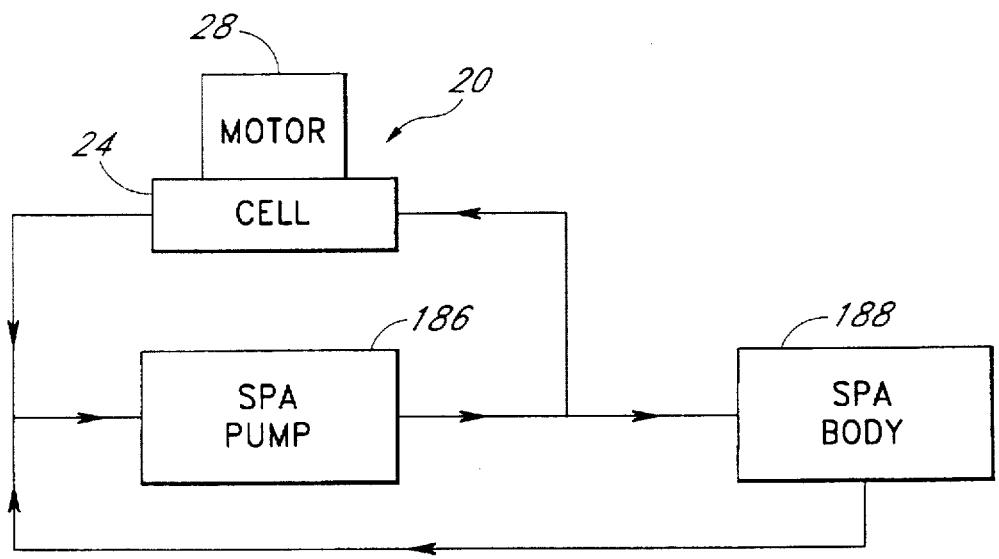
Figure 9C:
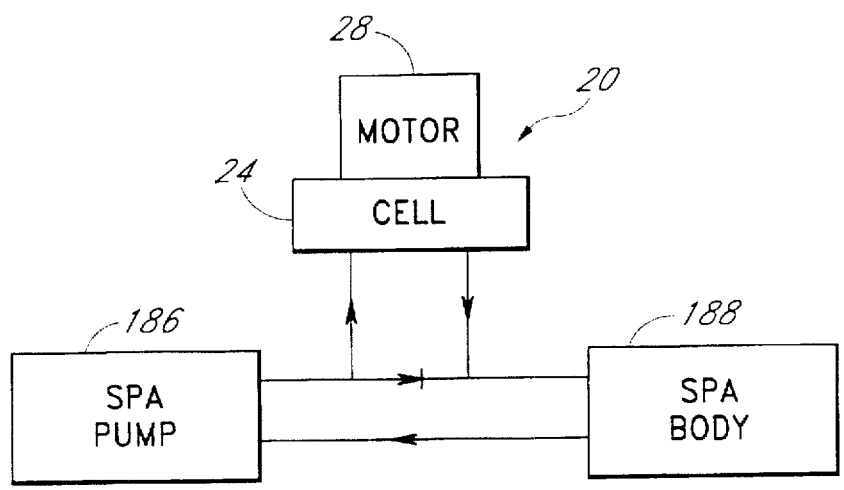

In the configuration illustrated in FIG. 9b, the generator 20 is positioned downstream of the spa pump 186. That is, water circulates from a spa body 188 through the pump 186, a portion through the cell 24, and back through the spa pump 186 and into the spa body 188. In this configuration the spa pump 186 enhances the water flow through the cell 24 and typically operates about four to six hours a day. Nevertheless, the rotating electrode 30 within the cell 24 is actuated when a potential is applied to the cell 24 to avoid buildup of entrapped gases (e.g., hydrogen and oxygen). In this configuration the cell 24 operates only with the circulation system.

FIG. 9c illustrates another "in-line" configuration of the halogen generator 20 in which the generator is installed downstream of a spa pump 186 which operates less than 24 hours a day (typically four to six hours a day). A conventional check valve is installed after a heater and performs both the function of a bypass valve and a check valve. The inlet and outlet of the cell 24 are tapped into the inlet and outlet of the check valve, respectively.

This configuration is used where the halogen generator 20 is intended to be operated 24 hours a day. Thus, when the spa pump 186 is on, the check valve is open and water flows both through the check valve and through the cell 24. When the spa pump 186 is off, the check valve is closed and the water flow in the circulation system flows through the cell 24.

Common to the in-line configurations of FIGS. 9a, 9b, and 9c, installing the halogen generator 20 directly in the circulation line allows for easy retrofit and eliminates the need for a separate wall fitting in the spa body 188. A separate wall fitting for the spa body 188 is not needed. And with the layouts illustrated in FIGS. 9a and 9b, the spa halogen generator 20 also can be plumbed in series with or in parallel to the spa heater 190.

Figure 9D:
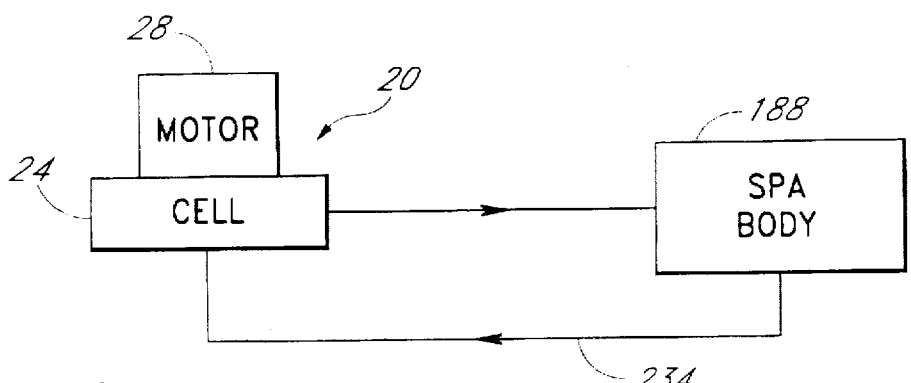

FIG. 9d illustrates a spa system configuration in which the spa halogen generator 20 is placed in a separate flow line 234 in communication with the spa body 188. The halogen generator 20 may be mounted close to the side of the spa body 188, as will be described below, or may be remotely located and connected via a length of tubing or hose. Remotely locating cell 24 and motor 28 may simplify installation and maintenance.

With reference to FIGS. 13a–c and 14, the halogen generator 20 can be incorporated into a single wall fitting assembly which inserts into a hole in the spa body 188 normally used for a spa jet. This approach allows operation completely independent from the circulation or jet pump line and simplifies installation and service. The inlet and outlet for the halogen generator 20 can be at the same level, or the inlet can be positioned at a higher elevation than the outlet. In either case, if a fault occurs in the motor 28, the halogen generator 20 design will allow gases to harmlessly vent to the atmosphere.

As seen in FIG. 13a, a wall mount fitting assembly 239 includes a coaxial manifold 240. The coaxial manifold 240 is connected to the generator 20 and comprises a cylindrical housing 242 within which fluid flow communicates between a first tube 244 and an inner coaxial lumen 246, and between a second tube 248 and an outer coaxial space 250. The first and second tubes 244, 248 extend from the housing 242 away from the spa body 188 toward the halogen generator 20 (not illustrated in FIG. 13a). One of the tubes 244, 248 functions as a water inlet to the generator 20 and the other as an outlet to the spa 188. Likewise, water flows in opposite directions through the coaxial lumens 246, 250, one lumen functioning as an inlet to the generator 20 and one as an outlet.

As discussed below in connection with the control system 32 used with the present halogen generator 20, an oxidation-reduction potential (ORP) sensor 252 may be used to activate the halogen generator 20. For this purpose, FIG. 13a illustrates one possible installation location of the ORP sensor 252 in which the sensor 252 extends into a sensor port 254 in the housing 242 at a perpendicular angle with respect to the axis of the housing 242. In this position the ORP sensor leads can be oriented in parallel to the water flow internal to the housing 242.

Although not illustrated, the sensor leads commonly comprise a pair of short wires extending in parallel from the sensor 252 and between which the fluid electrical potential can be measured. Orienting the leads in parallel with the water flow reduces entrapment of scale and other debris by the sensor leads. The ORP sensor 252 provides one method of monitoring the halogen concentration in the spa 188 for use in controlling the length and timing of the cell operation. Accordingly, the sensor 252 is preferably installed in a port in communication with the suction line from the spa to the cell. Alternatively, the sensor 252 may be installed in a position in which the leads extend into the volute 34 at a slight angle with the leads pointing in the same direction as the water velocity vector within the cell assembly 22. This will serve to reduce debris entrapment and also enhance the cleaning of the sensor leads as they will be subject to a high water velocity proximate the rotating impeller electrode 30.

The coaxial manifold 240 includes an outer male threaded region 256 which engages a coupling nut 258. The nut 258 couples the coaxial manifold 240 to a tubular portion 260 of a wall fitting 241 having mating external threads and forming an inlet to the spa body 188. The nut 258 thus secures the coaxial manifold 240 to the wall fitting 241. The coaxial manifold 240 fits within the tubular portion 260 and is sealed therein by virtue of an O-ring (not shown) seated within a groove 262.

A circular flange 264 formed on the spa end of the wall fitting 241 sits flush against the inner surface of the spa body 188 with a gasket 266 therebetween. A spa end of a tubular threaded element 267 is secured to the flange 264 creating an annular space therebetween. A tightening nut 268 mates with the threaded element 267 on the outer surface of the spa body 188 to secure the assembly to the spa.

An indicator ring 270 may be provided in the annular space between the wall fitting tubular portion 260 and tubular threaded element 267. The indicator ring 270 is provided with a plurality of LED indicators and is in electrical communication with the controller 32. The flange 264 is preferably translucent so as to expose the indicator LEDs to the inside of the spa body 188. The condition of the generator 20 determines which indicator LED is activated thus providing a convenient monitoring system without having to visually inspect the generator 20, as described below.

In one particular embodiment, a red, an amber, and three green LED indicators are provided around the indicator ring 270. The three green LED indicators may be illuminated constantly when the spa is sanitary and may be sequentially illuminated when the generator 20 is in operation. The amber LED indicator may be illuminated constantly when the halogen level is high, and blink when the halogen level is low. Finally, the red LED indicator can blink when there is a fault in the halogen generator 20. For an interesting visual enhancement, the indicator ring may be installed within a spa hydrotherapy jet outlet. Alternatively, the wall fitting may be designed as a light pipe with a single color LED indicator provided to warn of a fault in the system. Moreover, the provision of the LED indicator ring 270 is not limited to operation only in conjunction with the halogen generator 20 and may be installed as a stand-alone unit as an indicator of spa water quality for use with a conventional control system.

Figure 13B:
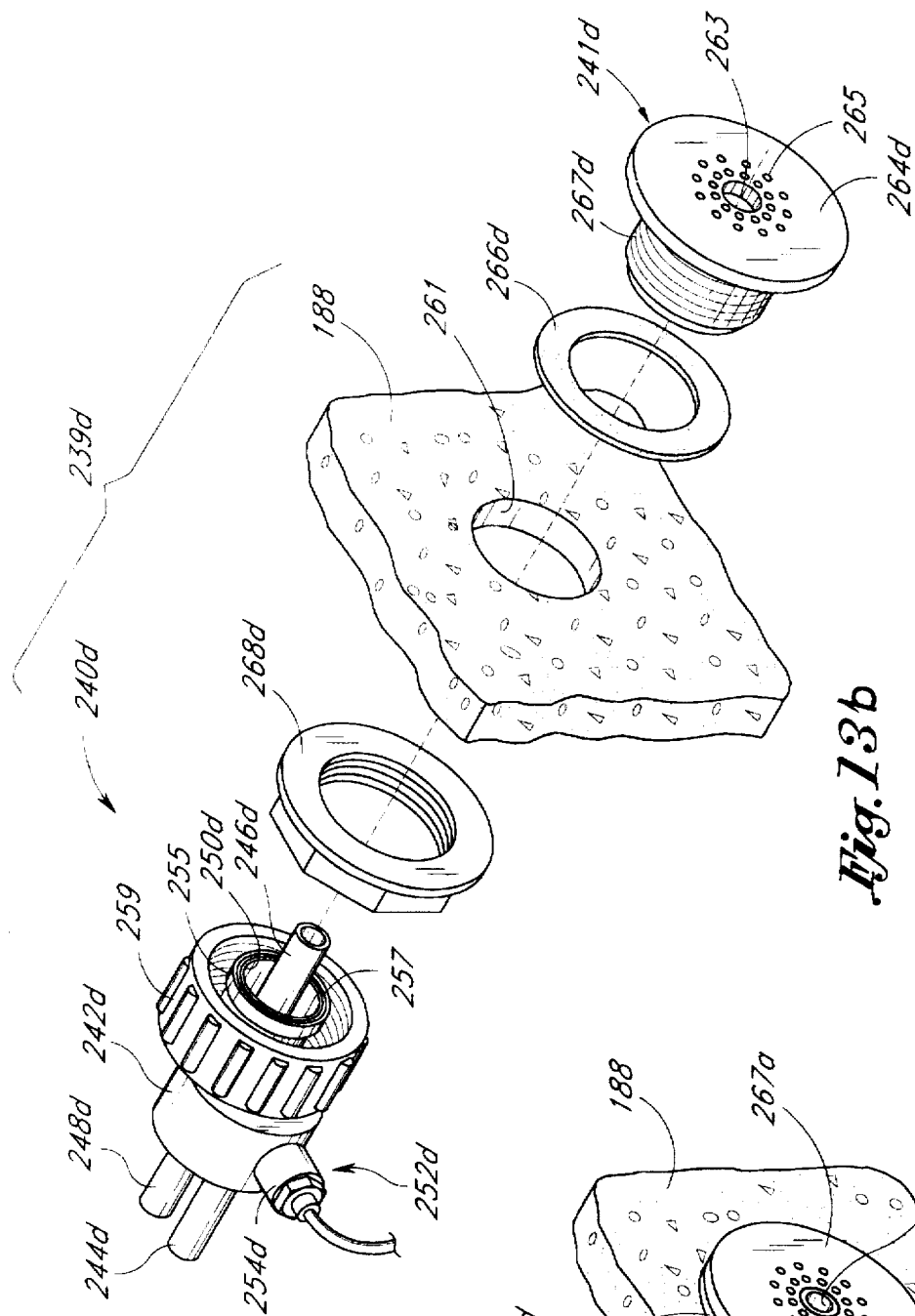
FIG. 13b is an exploded perspective view of a coaxial wall mount fitting assembly configured in accordance with another preferred embodiment of the present invention.
Figure 13C:
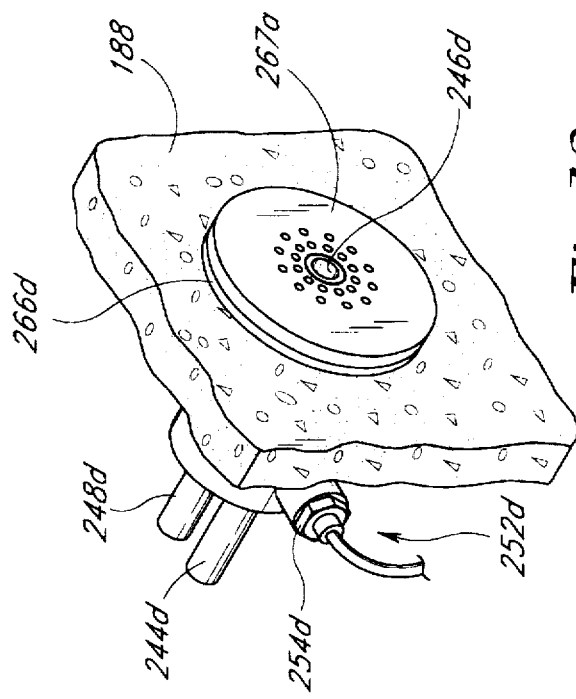
FIG. 13c is an assembled perspective view of the coaxial wall mount fitting assembly of FIG. 13b.

FIGS. 13b and 13c illustrate a simplified wall fitting assembly 239d for attaching the halogen generator 20 to the spa body 188. Where appropriate, like reference numerals with a "d" suffix have been used to indicate like components between the two embodiments of the wall mount fittings illustrated in FIG. 13a and 13b.

The present wall mount fitting assembly 239d includes a coaxial manifold 240d which is connected to the generator 20 (not illustrated in FIG. 13b) and a wall mount fitting 241d which is connected to the spa body 188. The coaxial manifold 240d comprises a cylindrical housing 242d within which fluid flow communicates between a first tube 244d and an outer tube 250d, and between a second tube 248d and an inner coaxial tube 246d. The first and second tubes 244d, 248d extend from the housing 242d away from the spa body 188 and toward the halogen generator 20 (not illustrated in FIG. 13b). The first tube 244d functions as a water inlet to the generator 20 and the second tube 248d functions as an outlet from the generator 20 to the spa 188. Likewise, water flows in opposite directions through the coaxial lumens of the coaxial tubes 246d, 250d. The lumen of the outer tube 250d functions as an inlet to the generator 20 and the lumen of the inner tube 246d functioning as an outlet from the generator 20.

An oxidation-reduction potential (ORP) sensor 252d may be integrated into the coaxial manifold 240d. FIG. 13b illustrates one possible installation location of the ORP sensor 252d in which the sensor 252d extends into a sensor port 254d in the housing 242d. The port 254d is positioned such that the sensor 252d extends into the housing 242d in a direction which is generally normal to the longitudinal axis of the housing 242d. In this position, the leads of the ORP sensor 252d can be oriented in parallel to the water flow internal to the housing 242d.

As discussed above, the sensor leads may comprise short wires which extend parallel to each other from the sensor 252d and between which the water electrical potential can be measured. The port 254d, in which the sensor 252d is installed, desirably is in communication with the suction line from the spa body 188 to the halogen generator 20. The sensor 252d alternatively can be installed in a position in which the sensor leads extend into the volute 34 at a slight angle with the leads pointing in the same direction as the water velocity vector within the cell assembly 22. This will serve to reduce debris entrapment and also enhance the cleaning of the sensor leads as they will be subject to high water velocities proximal to the rotating impeller electrode 30.

As best seen in FIG. 13b, the coaxial manifold 240d includes a flange 255 which circumscribes the outer tube 250d. The flange 255 includes an annular groove 257 formed in its front facing surface. The groove 257 forms an O-ring seat on the front face of the flange 255 about the lumen of the outer tube 250d. The flange 255 has a diameter larger than the outer tube 250d but smaller than the housing 242d.

The coaxial manifold 242d also includes a slidable collar 259 which is captured between the housing 242d and the flange 255. The collar 259 secures the coaxial manifold 240d to the wall fitting 241d, as described below.

The collar 259 has a tubular shape with a closed end proximate to the housing 242d. The closed end includes a central hole which receives the outer tube 250d. In this manner, as understood from FIG. 13b, the inner and outer tubes 246d, 250d pass through the collar 259.

The collar 259 includes an inner thread on an inner surface of the collar 259 which slides over the flange 255 and outer tube 250d. The inner thread is configured to cooperate with the external threads of the wall fitting 241d mounted to the side of the spa body 188, as described below.

The collar 259 moves from a first position in which its front inner thread (i.e., the thread closest to the spa body 188) lies behind the front face of the flange 255 to a second position in which its front inner thread lies forward of the front face of the flange 255. In this manner, the collar 259 moves from a position in which the flange 255 abut the rear end of the wall mount fitting 241d without interference from the collar 259, to a position in which the collar 259 engages the external threads of the wall mount fitting 241d to compress the O-ring between the flange 255 and the rear end of the fitting 241d and to secure the coaxial manifold 240d to the fitting 241d.

The wall fitting 241d is positioned on the inside of the spa body 188 and is adapted to extend through a hole 261 in the body 188. The wall fitting 241d includes a circular flange 264d formed on the spa end of the wall fitting 241d to sit flush against the inner surface of the spa body 188 with the gasket 266d interposed therebetween. The circular flange 264d includes a center hole 263 which is sized to receive the end of the inner tube 246d. As seen in FIG. 13c, when assembled, the end of the inner tube 246d extends through the central hole 263 and lies generally flush with the face of the circular flange 264d. The circular flange 264d also includes a plurality of smaller orifices 265 which are positioned about the larger center hole 263. The smaller orifices 265 extend through the flange 264d and communicate with an inner space defined by a tubular shank 267d.

As understood from FIG. 13b, the tubular shank 267d has an outer diameter sized to fit through the hole 261 in the spa body 188. The shank 267d carries an external thread which cooperates with the internal threads on the collar 259 of the coaxial manifold 240d. The external threads on the tubular shank 267d also cooperate with a tightening nut 268d which is used to secure the wall fitting 241d to the spa wall. With the externally threaded shank 267d of the wall fitting 241d extending through the hole 261 in the spa body 188, the nut 268d screws onto the outer end of the shank 267d. The nut 268d is tightened until the flange 264d firmly compresses the gasket 266d against the wall of the spa body 188. Before the coaxial manifold 240d is coupled to the wall fitting 241d, an end cap (not shown) also may be screwed onto the threaded shank 267d to prevent water flow through the wall fitting 241d when not in use.

FIG. 13c illustrates the wall fitting assembly 239d attached to the spa body 188. To attach the coaxial manifold 240d to the installed wall fitting 241d, the collar 259 is threaded onto the end of the threaded shank 267d outside the spa body 188. The O-ring on the flange 255 of the coaxial manifold 240d is compressed against an annular rear facing surface on the end of the threaded shank 267d. As the collar 259 is tightened onto the shank 267d, the O-ring is compressed to form a seal between the coaxial manifold 240d and the threaded shank 267d of the wall fitting 241d.

With the coaxial manifold 240d attached to the wall fitting 241d, the inner tube 246d of the manifold 240d extends through the threaded shank 267d and through the large center hole 263 in the circular flange 264d. As discussed above, the inner tube 246d desirably extends to a point flush with the front surface of the circular flange 264d. The outer tube 250d desirably has a size which generally corresponds with the size of the threaded shank 267d such that the inner space within the tubular threaded shank 267d communicates with the lumen of the outer tube 250d.

As understood from FIG. 13c, when the wall mount fitting assembly 239d is assembled, water, which is drawn through the small holes 265 in the circular flange 264d of the wall fitting 241, flows through the inner space of the threaded shank 267d, through the lumen of the outer tube 250d and through the suction tube 244d into the spa generator 20. The small holes 265 of the circular flange 264d function as a filter to prevent large particles or debris from being drawn into the spa generator 20. The outlet of the spa generator 20 communicates with the outlet tube 248d which in turn communicates with the inner tube 246d. Thus, the water flow from the generator 20 is returned to the spa body through the inner tube 246d positioned at the center of the circular flange 264d of the wall fitting 241.

FIG. 14 illustrates another simplified fitting assembly for attaching the halogen generator 20 to the spa body 188. The assembly includes a housing 272 having parallel through bores for receiving a pair of tubular conduits 274, 276 representing an inlet and an outlet, respectively, from the halogen generator 20. The housing 272 includes a cylindrical portion 278 having a diameter sized to closely fit within a threaded tubular portion 280 of a wall fitting 282. A flange 284 on the housing 272 abuts a terminal lip of the tubular portion 280. Preferably, the cylindrical portion 278 is solvent bonded within the tubular portion 280. The diameters of the flange 284 of the housing 272 and of the tubular portion 280 of the wall fitting 282 are sized to fit through an aperture in the spa body 188.

A retaining nut 286 engages the tubular portion 280 to retain the wall fitting 282 on the spa body 188. Tightening nut 286 compresses a gasket 288 between a wall fitting flange 290 and the spa body 188 to provide a fluid seal therebetween. A plug 292 fits within an inner recess 294 in the wall fitting 282. The plug 292 may be used when disassembling the halogen generator 20 from outside the spa body 188 for repair, or otherwise, to prevent water from escaping the spa through the wall fitting 282. The plug 292 has smooth sides and snugly fits into the recess 294 so as to easily be expelled therefrom in the event of an unsafe buildup of entrained gasses within the halogen generator 20, such as might happen if the plug 292 is inadvertently left installed with the cell 24 in operation.

Scale Trap

With reference to FIG. 15, a scale trap 296 can be used with the present spa halogen generator 20. In the illustrated embodiment, the scale trap 296 is attached to the outlet conduit 276 from the halogen generator 20 which passes directly through the spa body 188.

The scale trap 296 comprises an open top container 298 having an inlet 300 from the conduit 276 approximately half way up from the bottom of the container 298. Water from the halogen generator 20 is discharged through the inlet port 300 and into the scale trap 296. The scale trap 296 desirably is mounted beneath the water level of the spa so that the water discharged from the halogen generator 20 enters and mixes with the existing water in the spa. Particles of scale discharged from the halogen generator 20 generally fall under gravity to the bottom of the trap 296. The spa owner must occasionally check and empty the trap 296 to avoid clogging the trap inlet port 300. The rudimentary configuration of the scale trap 296 is shown as an example only and other embodiments which provide automatic scale removal, for instance, also are possible.

Controller and Electrical Supply System

Figure 16A:
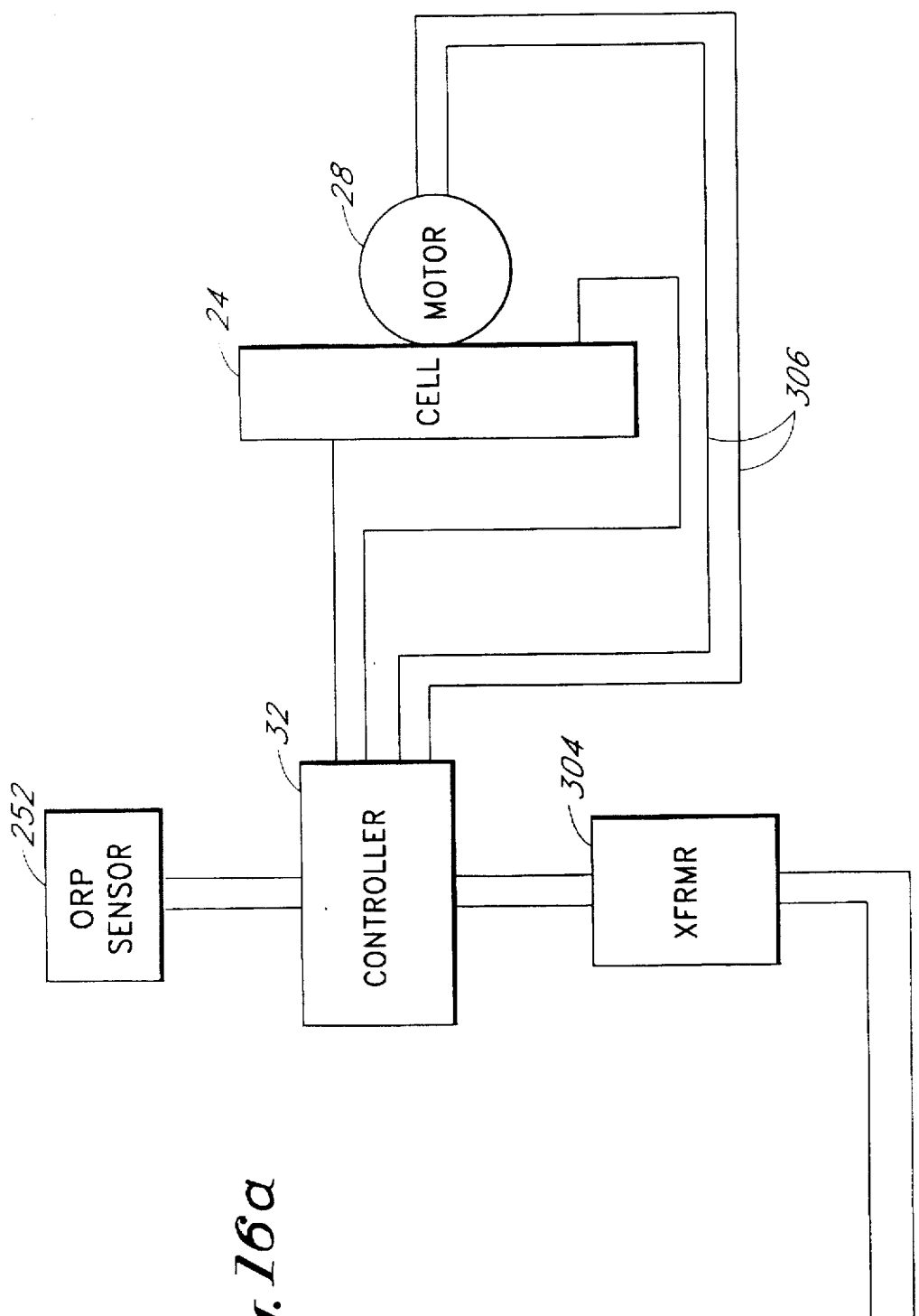
FIG. 16a is a block diagram of a spa halogen generator control system utilizing a DC motor.

With reference to FIGS. 1 and 16a, the controller 32 includes a positive terminal 146 and a negative terminal 142 which are connected to the anode 98 and the cathode 96, respectively. The controller 32 also desirably exhibits one or more indicator lights 302 for displaying the operating condition of the halogen generator 20, as described below. For instance, the indicator lights 302 light if the cell 24 is energized.

As understood from the block diagram of FIG. 16a, the controller 32 derives power from an external source through a transformer 304, which is shown as a separate element from the controller 32 but is preferably formed integrally therewith. The controller 32 also supplies energy to the drive motor 28 via power leads 306.

FIG. 16a also illustrates the electrical connection between ORP sensor 252 with the controller 32. The controller 32 senses the ionic potential, and thus the halogen concentration, of the water within the spa body via the oxidation-reduction potential (ORP) sensor 252. The control circuit must determine when the halogen concentration falls below a prescribed value to initiate the cell operation. If the controller 32 detects a voltage below this prescribed value, it will initiate the cell output which will continue until the halogen concentration increases to a desirable level. This operational cycle is shown and described with reference to FIG. 17b. Alternatively, a timed output cell cycle may be utilized, this cycle being described with reference to FIG. 17a.

Figure 16B:
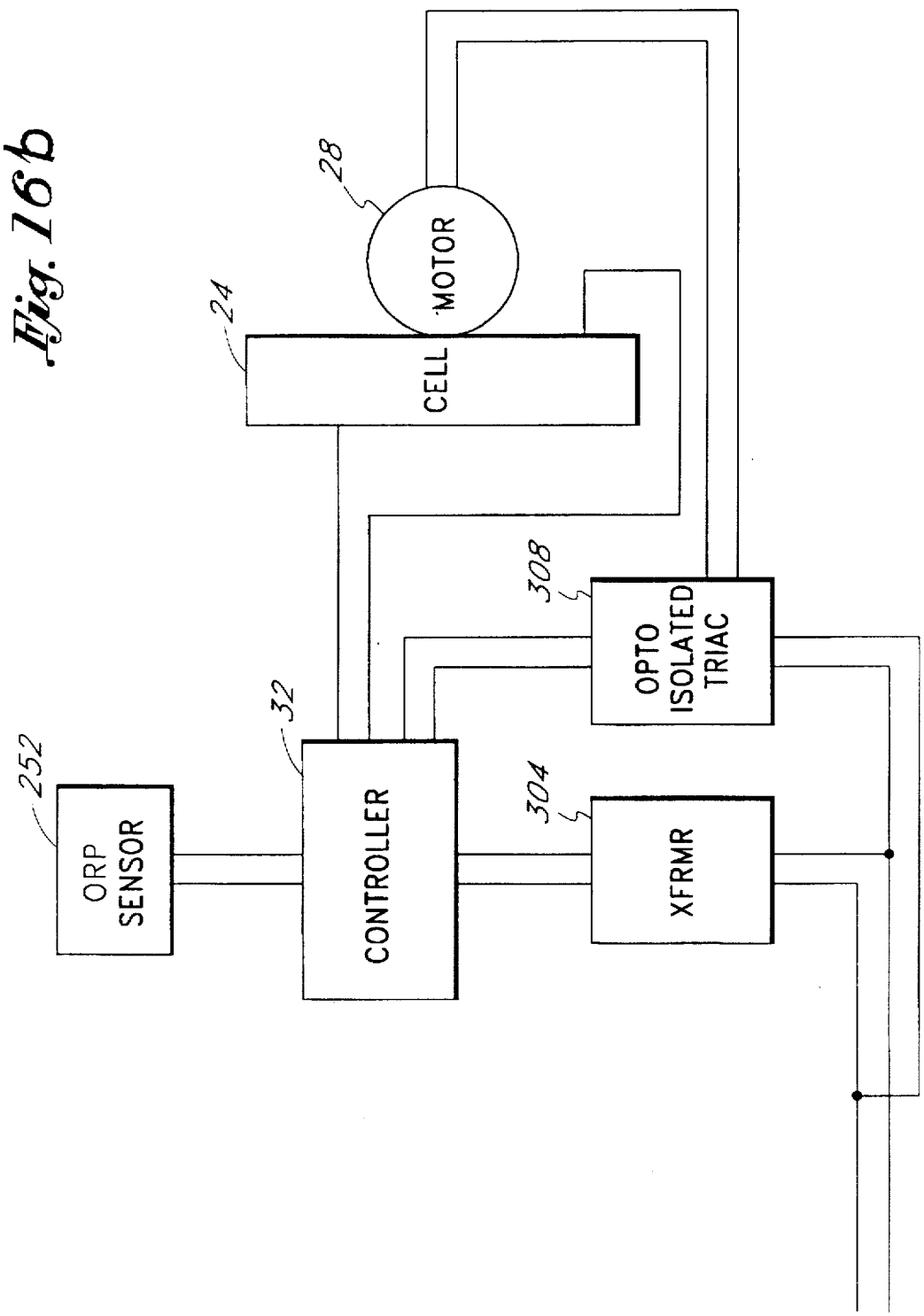
FIG. 16b is a block diagram of a spa halogen generator control system utilizing an AC motor.

FIG. 16b illustrates a control system for use with an AC motor 28. In this embodiment, a simple on/off control 308, or optoisolated triac is included in the power supply from the controller 32 to the motor 28.

The controller 32 can be completely housed within a polymeric enclosure with a terminal strip to which the various I/O lines can be connected. The secondary of an external class II transformer is also connected to this strip. The current is phase controlled to minimize heat generation within the enclosure and supply constant current output to both the DC motor 28 and the cell 24. With this arrangement, the current to the motor 28 can be varied via programming for different installations, i.e., an independent wall fitting installation versus one with the pump cell 24 in parallel with the spa circulation system. Alternatively, the power to the pump can be supplied from the primary of the class II transformer and controlled via optoisolators.

Controller Timed Operation of Spa Halogen Generator

Figure 17A:
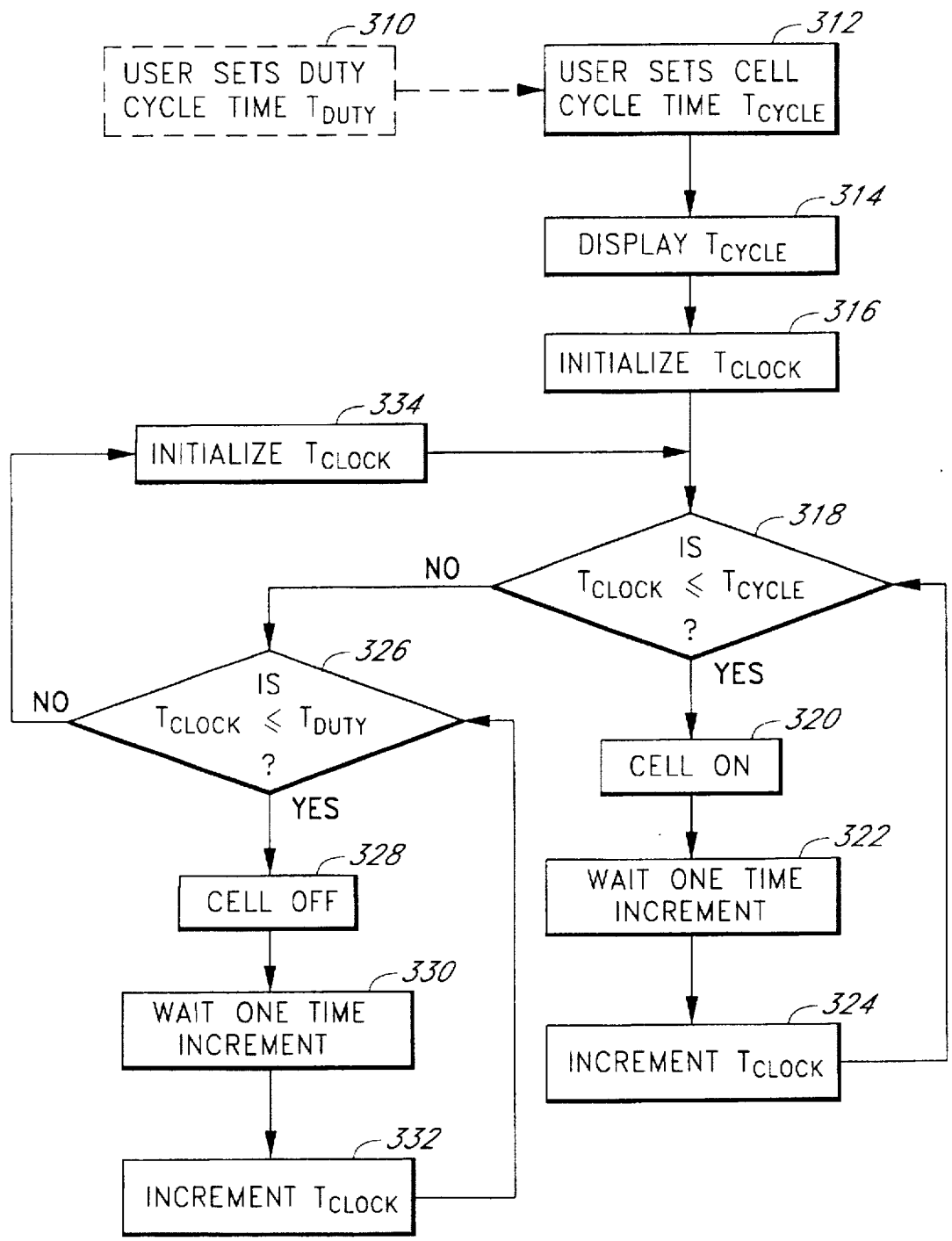
FIG. 17a is a flowchart of a timed sequence operating cycle of a spa halogen generator controller.

FIG. 17a depicts a flowchart which illustrates the general operation of the controller 32 which actuates the halogen general 20 at regular intervals throughout the day. Initially, as represented in operation block 310, the user or manufacturer of the generator 20 sets the duty cycle time. The duty cycle time is repeated throughout a 24-hour period and the cell 24 is instructed to remain in operation for a fraction of each duty cycle. The user also sets the cell cycle time, as represented in operation block 312, by turning a time dial (not illustrated) or likewise adjusting a timer which may be located on the controller 32. The time dial indicates a range of time increments or percentages of a maximum time. For instance, the time dial may be marked with a range of 1 to 20 minutes. The setting of the time dial fixes the amount of time the cell 24 remains on during each duty cycle. If the duty cycle is set to 20 minutes, and the time dial is set to 20 minutes, then the cell 24 will remain on continuously. On the other hand, if the time dial is set to 10 minutes, the cell 24 will turn on at the beginning of each duty cycle but will remain on for only half the duty cycle, thus resulting in an output of the cell 24 which is 50% of it potential. The controller 32 desirably displays the cell cycle time set by the user, as represented in operation block 314, either directly on the dial or on a separate display.

The controller 32 initializes an internal clock counter $T_{clock}$ (see operation block 316). The controller 32 thereafter compares the clock counter $T_{clock}$ with the cycle counter $T_{cycle}$ (decision block 318). As referred to herein, the time variables are counters which may be gauged in minutes or other increments. Alternatively, the controller 32 may operate on a more continuous time basis. As represented in decision block 318, if the clock time $T_{clock}$ is less than or equal to the cycle time $T_{cycle}$, then the system has not been in operation for the full cycle time of the cell 24. In this case, the cell 24 is energized or remains energizes, as represented in operation block 320. The controller 32 waits one time increment, as indicated in operation block 322, and then increments the clock time $T_{clock}$ (see operation block 324). The controller 32 again compares whether the clock time $T_{clock}$ is less than or equal to the cycle time $T_{cycle}$ (see decision block 318). This routine continues until the clock time $T_{clock}$ reaches or exceeds the cycle time $T_{cycle}$. In the example where the cycle time $T_{cycle}$ is set at 10 minutes, the system and cell 24 will be in operation until the clock time reaches or exceeds 10 minutes.

Once the clock time $T_{clock}$ equals or exceeds to the cycle time $T_{cycle}$, the controller 32 compares the clock time $T_{clock}$ against the duty time $T_{duty}$, as represented in decision block 326. In the present example, the duty time $T_{duty}$ is set at 20 minutes and the clock time $T_{clock}$ is only at 10 minutes when the controller 32 initially compares these times. If the clock time $T_{clock}$ is less than the duty time $T_{duty}$, the controller 32 will turn off the halogen generator (operation block 328). The controller 32 waits one time increment, as indicated in operation block 330, and then increments the clock time $T_{clock}$ (see operation block 332). The controller 32 again compares whether the clock time $T_{clock}$ is less than or equal to the duty time $T_{duty}$ (see decision block 326). This routine continues until the clock time $T_{clock}$ reaches or exceeds the duty time $T_{duty}$.

When the clock time $T_{clock}$ reaches or exceeds the duty time $T_{duty}$ the system has been operational for one complete duty cycle and is ready to be reset. The controller 32 reinitializes the clock time $T_{clock}$, as represented in operation block 334, and the duty cycle begins with the controller 32 stepping through the operating steps described above.

At any time during the duty cycle, the user may reset the cell cycle time in $T_{cycle}$ (see operation block 312). Resetting the cycle time $T_{cycle}$ affects the clock timing cycle (represented by decision block 318 and operation blocks 320–324). If, however, the system is completing a duty cycle after the cell 24 has been on for its set cycle time, then the new cycle time $T_{cycle}$ will take affect when the system resets for the next duty cycle.

Figure 17B:
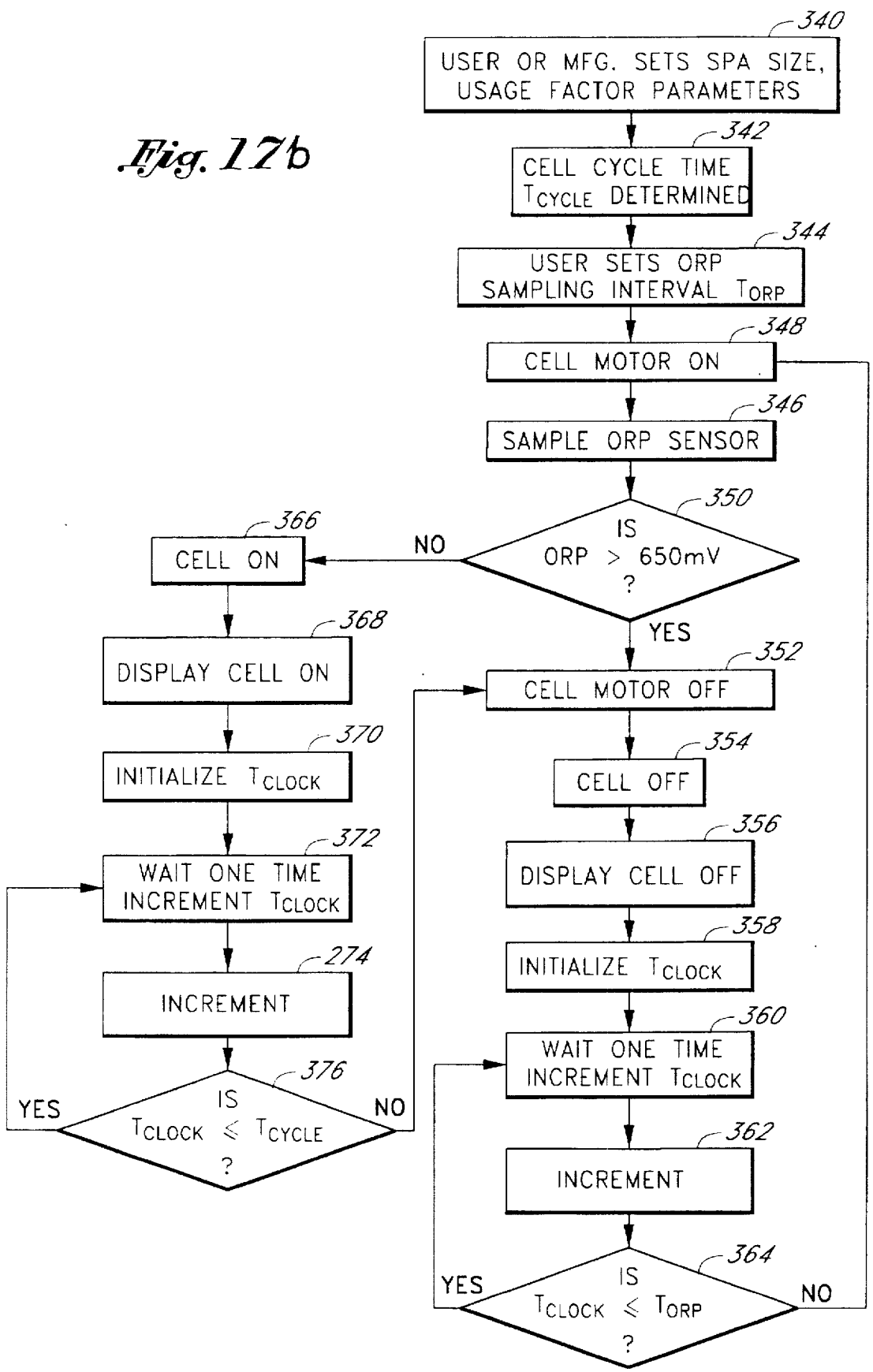
FIG. 17b is a flowchart of a sensor-activated operating cycle of the spa halogen generator controller.

FIG. 17b depicts a flowchart which illustrates the general operation of the controller 32 when operated to automatically actuate the halogen generator 20, depending upon the level of sterilant within the spa water. In this automatic mode, the cell 24 is not on for any predetermined cycle time, but is instead turned on only when the halogen concentration in the spa body goes below a set level. The halogen concentration in the water within the spa body is determined by sensing the oxidation-reduction potential (ORP) of the water. A measurement of the ORP indicates the ionic potential within the water, which is proportional to the number of free ions therein. As mentioned above, the number of free halogen ions, such as chlorine or bromine, is preferably maintained at a minimum level so as to sanitize the spa.

With reference to FIG. 17b, the user or manufacturer of the spa initially sets several parameters to control how long the cell 24 will be turned on when the ORP falls below a particular level (see operation block 340). These parameters may include the size of the spa body, an estimation of the amount of usage or usage factor, or other such parameters. These parameters allow the controller 32 to determine the cell cycle $T_{cycle}$, as represented in operation block 342. Conversely, the user or manufacturer may directly input the cell cycle time $T_{cycle}$ into the controller 32 (not illustrated). The user then sets an ORP sampling interval $T_{ORP}$ (operation block 344). The ORP sampling interval $T_{ORP}$ is somewhat like the aforementioned duty cycle time $T_{duty}$ in the time based control system diagramed in FIG. 17a. That is, the controller 32 samples the reading from the ORP sensor 252 (as represented in operation block 346), at the preset intervals $T_{ORP}$.

Prior to sampling the ORP sensor 252, however, the controller 32 turns on the cell motor 28 (see operation block 348) to provide flow across the ORP sensor 252. The sensor 252 gradually polarizes when immersed in essentially stationary water and the flow across the sensor 252 acts to re-calibrate it and ensures an accurate reading.

After sampling the ORP sensor 252, the controller 32 compares the resulting voltage level ORP with a constant (see decision block 350). The constant is determined by the preferred ionic potential of the water, which is related to the amount of sanitizing halogen therein. Although this constant may be varied by several factors, it is typically between 600 and 700 millivolts, and most preferably is about 650 millivolts.

If the oxidation reduction potential is greater than about 650 millivolts, then the halogen concentration is sufficient within the spa body 168 and the controller 32 turns off the cell motor 28 (operation block 352) and the cell 24 (operation block 354). The controller 32 indicates the off status of the halogen generator 20 (see operation block 356). As described above, this display may involve an LED indicator which is visible through the spa body (e.g., on the indicator ring 270) and/or an LED indicator located an exterior access panel of the controller 32 (e.g., the indicator light 302 on the controller 32).

The controller 32 then initializes the clock time $T_{clock}$ (operation block 358) and waits one time increment (operation block 360), before incrementing the clock time $T_{clock}$ (operation block 362). After incrementing the clock time $T_{clock}$, the controller 32 compares the clock time $T_{clock}$ with the sampling interval of the ORP sensor $T_{ORP}$, as represented in decision block 364. If the clock time $T_{clock}$ does not equal or exceed the sampling interval of the ORP sensor $T_{ORP}$, the controller 32 waits one time increment (operation block 360) before again incrementing the clock time $T_{clock}$ (operation block 362). After incrementing the clock time $T_{clock}$, the controller 32 compares the clock time $T_{clock}$ with the sampling interval of the ORP sensor $T_{ORP}$, as represented in decision block 364.

Once the clock time $T_{clock}$ equals or exceeds the sampling interval of the ORP sensor $T_{ORP}$, the controller 32 energizes the motor 28 of the halogen generator 20 (see operation block 348) and re-samples the reading from the ORP sensor 252 (see operation block 346). The controller 32 then compares the resulting voltage level ORP with the constant (see decision block 350). If the oxidation reduction potential is greater than about 650 millivolts, then the particular halogen concentration is sufficient within the spa body 168 and the controller 32 turns off the cell motor 28 (operation block 352). The controller 32 then proceeds through the above described timing routine until its time to take another sample reading from the ORP sensor 252.

If the oxidation reduction potential falls below about 650 millivolts, the controller 32 turns on the cell 24 (see operation block 366) to replenish the halogen concentration within the spa body 188. The controller 32 indicates the active status of the halogen generator (see operation block 368) by lighting an LED indicator which is visible through the spa body (e.g., on the indicator ring 270) and/or located an exterior access panel of the controller 32.

The controller 32 initializes the clock time $T_{clock}$, as represented in operation block 370, and waits one time increment (operation block 372) before incrementing the clock time $T_{clock}$ (operation block 374). The controller 32 then compares the clock time $T_{clock}$ with the cycle time $T_{cycle}$, as represented in decision block 376. Before the clock time $T_{clock}$ reaches or exceeds the cycle time $T_{cycle}$, the controller 32 repeats the above timing cycle (represented by operation blocks 372–374 and decision block 376). When the clock time $T_{clock}$ equals or exceeds the cycle time $T_{cycle}$ indicating the cell 24 has been on for the desired period (see decision block 376), the controller 32 turns off the halogen generator 20 (see operation blocks 352, 354). The controller 32 again indicates the inactive status of the halogen generator 20 (see operation block 356) by lighting the LED indicator which is visible through the spa body on the indicator ring 270 and/or located an exterior access panel of the controller 32. At this point, the controller 32 returns to the timing cycle between sampling intervals, which was described above and is represented by operation blocks 360–362 and decision block 364.

It should be noted that the cell 24 is deactivated (see operation block 354) before the ORP sensor 252 is sampled (see operation block 346). This is important because the ORP sensor 252 is grounded and would be influenced by the potential between the cell electrodes if the cell 24 were energized.

With the cell 24 turned off and the next sampling interval $T_{ORP}$ reached, the halogen level in the spa water may still be insufficient. The controller 32 reactivates the cell 24 (see operation block 366) for another halogen generating cycle. This continues until the oxidation reduction potential reaches or exceeds a predetermined level. It can thus be appreciated that the operation system diagramed in FIG. 17b is completely automatic and will maintain the proper halogen level within the spa at all times.

Controller Operated Descaling Cycle

The controller 32 also can control the operation of the descaling cycle of the cell 24. In the illustrated embodiment, the controller 32 monitors the current draw of the motor 28 of the halogen generator 20. As scale builds up on the electrode surfaces within the cell 24, the motor 28 experiences more drag and additional loading. This added load translates into a current increase through the motor 28 which the controller 32 can monitor. The controller 32 implements a descaling cycle implemented when the current increases by a predetermined percentage, such as, for example, a 20% increase from normal current draw of the motor 28.

Sensing the motor current will also indicate a problem with loss of fluid prime within the halogen generator 20. If there is no fluid in the cell assembly 22, the motor 38 will experience a dramatic reduction in load and associated decrease in current flow. A significant drop of motor current, such as, for example, 50% or greater, may be indicative of a loss of prime. In such a case, the controller 32 should deactivate the halogen generator 20. Occasionally, massive scale buildup followed by a cleaning cycle will dislodge a large quantity of scale leading to a clog which can "seize" small motors. In this situation, the controller 32 can sense the rapid increase in current draw by the motor 28 and trigger a rapid series of motor reversals to dislodge the clog.

In all of these cases, the current through the motor 28 is detected in conventional ways and this information is used by the controller 32 to instigate various responses described. The specific circuit diagrams and logic used are believed within the scope of experience of one skilled in the motor feedback and control art and will not be described herein.

The current through the cell 24 may also be monitored as a means of determining the timing and duration of cell operation. More specifically, as scale builds up, the cell current will increase. In this situation, the controller 32 will run the cell 24 for a longer period than normal to compensate for the reduced halogen concentration generated by a less than efficient, or scaled cell. Optionally, the operation of the cell 24 may coincide with the operation of the spa jet booster pump or air injection blower to increase the halogen generation in periods of increased need.

Although this invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. A halogen generator for producing a halogen sanitizing agent in a body of water of a water feature, said generator comprising a cathode and an anode which are spaced apart from each other within a housing, said cathode and anode having planar shapes, and a least one vane positioned between said cathode and anode, said vane and said cathode being supported to rotate relative to each other with said vane being sufficiently closely spaced to said cathode to inhibit scale formation on said cathode but not contacting said cathode, said vane adapted for rotation about an axis which is normal to the plane of said cathode.

2. A halogen generator as in claim 1 additionally comprising an impeller which is positioned between said anode and said cathode and is mounted to rotate relative to said cathode and said anode, said impeller carrying a plurality of said vanes.

3. A halogen generator as in claim 1, wherein said vane is spaced from said cathode by a distance within the range of about 0.010 to about 0.050 inches.

4. A halogen generator as in claim 3, wherein said vane is spaced from said cathode by a distance ranging between about 0.010 and about 0.030 inches.

5. A halogen generator as in claim 1, wherein said cathode and said anode both have disc-like shapes with generally equal diameters.

6. A halogen generator as in claim 5, wherein said cathode is formed of an electrically conductive, corrosion resistant material of a thickness ranging between about 0.020 and about 0.250 inches.

7. A halogen generator as in claim 6, wherein said cathode is formed of 316L Stainless Steel with a sheet thickness of about 0.032 inches.

8. A halogen generator as in claim 6, wherein said cathode has a generally polished surface on a side facing said vane with a Ra surface finish ranging between 8 and 16.

9. A halogen generator as in claim 5, wherein said anode is formed of an electrically conductive, corrosion resistant material with a catalytic coating and a sheet thickness ranging between about 0.020 and about 0.250 inches.

10. A halogen generator as in claim 9, wherein said anode is formed of titanium with a sheet thickness of about 0.060 inches coated with at least one precious metal oxide.

11. A halogen generator as in claim 1, wherein said vane is arranged to rotate over a flat plate of said cathode which generally is rotationally fixed relative to said vane.

12. A halogen generator as in claim 11, wherein said cathode plate is movable in a direction generally normal to said plate to vary the spacing between said cathode plate and said vane.

13. A halogen generator as in claim 12, wherein said cathode plate is movable from a first position in which said vane is spaced from said cathode plate by a first distance which is at least 0.030, to a second position in which said vane is spaced from said cathode plate by a second distance, said second distance being smaller than said first distance.

14. A halogen generator as in claim 13, wherein said cathode plate is in said first distance with said vane rotating at a first rotational speed and in said second distance with said vane rotating at a second rotational speed, said second rotational speed being greater than said first rotational speed.

15. A halogen generator as in claim 14, wherein said cathode plate is connected to a biasing mechanism which biases said cathode plate to lie in said first position when said vanes rotate at said first rotational speed.

16. A halogen generator for producing a halogen sanitizing agent in a body of water of a water feature, said generator comprising a cathode and an anode which are spaced apart from each other within a housing, and an impeller positioned between said anode and said cathode and mounted to rotate relative to said anode and said cathode, said impeller adapted to rotate in a first rotational direction relative to said cathode and in an opposite second rotational direction relative to said cathode, said impeller carrying at least one vane being supported to rotate relative to said cathode while being sufficiently closely spaced to said cathode to inhibit scale formation on said cathode but generally not contacting said cathode.

17. A halogen generator as in claim 16, wherein said vanes are configured to propel water through said housing when said impeller rotates in said first rotational direction.

18. A halogen generator for producing a halogen sanitizing agent in a body of water of a water feature, said generator comprising a cathode and an anode which are spaced apart from each other within a housing, and an impeller positioned between said anode and said cathode and mounted to rotate relative to said anode and said cathode, said impeller comprising a first electrode surface facing said cathode and a second electrode surface facing said anode, said first and second electrode surfaces electrically communicating with each other, said impeller carrying at least one vane being supported on said first side of said electrode plate to rotate relative to said cathode while being sufficiently closely spaced to said cathode to inhibit scale formation on said cathode but generally not contacting said cathode.

19. A halogen generator as in claim 18, wherein said impeller comprises an electrode plate with said first electrode surface being formed on a first side of said plate and said second electrode surface being formed on an opposite second side of said electrode plate.

20. A halogen generator as in claim 18, wherein said vanes are formed of a non-conductive material.

21. A halogen generator as in claim 18, wherein said first electrode surface and said cathode are spaced apart by about 0.150 inches and said vanes and said cathode are spaced apart by about 0.010 to 0.030 inches.

22. A halogen generator as in claim 21, wherein said second electrode surface and said anode are spaced apart by about 0.150 inches.

23. A halogen generator for producing a halogen sanitizing agent in a body of water of a water feature, said generator comprising a cathode and an anode which are spaced apart from each other within a housing, and an impeller positioned between said anode and said cathode and mounted to rotate relative to said anode and said cathode, said impeller carrying at least one vane being supported to rotate relative to said cathode while being sufficiently closely spaced to said cathode to inhibit scale formation on said cathode but generally not contacting said cathode, said cathode being movable with respect to said impeller between a first position, in which said cathode is spaced from said impeller by a first distance, and a second position, in which said cathode is spaced from said impeller by a second distance, said first distance being greater than said second distance.

24. A halogen generator as in claim 23 additionally comprising a biasing mechanism which biases said cathode to lie in said first position, yet permits said cathode to move between said first and second positions.

25. A halogen generator as in claim 24, wherein said biasing mechanism comprises a spring which supports said cathode adjacent to said impeller.

26. A halogen generator as in claim 25, wherein said spring circumscribes a centrally positioned hole of said cathode, and supports a terminal post over said cathode hole while electrically connecting said terminal post to said cathode.

27. A halogen generator as in claim 23, wherein said cathode lies in said first position with said impeller turning at a first rotational speed and lies in said second position with said impeller turning at a second rotational speed, said second rotational speed being greater than said first rotational speed.

28. A halogen generator as in claim 23, wherein said first distance generally ranges between about 0.03 to about 0.1 inches, and said second distance generally ranges about 0.03 inches to 0.01 inches.

29. A halogen generator for producing a halogen sanitizing agent in a body of water of a water feature, said generator comprising a cathode and an anode which are spaced apart from each other within a housing, and a least one vane positioned between said cathode and anode, said vane and said cathode being supported to rotate relative to each other with said vane being sufficiently closely spaced to said cathode to inhibit scale formation on said cathode but generally not contacting said cathode, said vane being attached to said anode.

30. A halogen generator as in claim 29, wherein said cathode and anode are spaced apart by a distance of about 0.150 inches.

31. A halogen generator for producing a halogen sanitizing agent in a body of water feature, said halogen generator comprising a bipolar cell including at least one electrode positioned between an outer anode and outer cathode, said electrode being mounted to rotate relative to said anode and said cathode and being spaced from said cathode by a distance generally not greater than 0.15 inch so as to inhibit scale formation on said cathode without contacting said cathode, and a source of electricity connected to said anode and said cathode without connection to said rotary electrode.

32. A halogen generator as in claim 31, wherein said anode includes a stationary baffle which extends within the space between electrode and said anode.

33. A halogen generator as in claim 32, wherein said electrode is spaced from said anode by a distance ranging between about 0.075 and about 0.15 inches.

34. A halogen generator as in claim 32, wherein said baffle is spaced from said electrode by a distance ranging between about 0.03 and about 0.1 inches.

35. A halogen generator as in claim 31, wherein said cathode, anode and electrode all have disc-like shapes with generally equal diameters.

36. A halogen generator as in claim 35, wherein said cathode, anode and electrode all have a diameter equal to about 2.5 inches.

37. A halogen generator as in claim 31, wherein said cathode includes an electrically conductive, corrosion resistant plate having a thickness of about 0.032 inches.

38. A halogen generator as in claim 37, wherein said plate of said cathode is polished at least on one side, having a Ra surface finish of about 8 to about 16.

39. A halogen generator as in claim 31, wherein said anode includes an electrically conductive, corrosion resistant plate having a thickness of about 0.06 inches and is coated on at least one side with a precious metal oxide coating.

40. A halogen generator as in claim 31, wherein said electrode includes an electrically conductive, corrosion resistant plate having a thickness of about 0.06 inches with a precious metal oxide coating.

41. A halogen generator as in claim 31, wherein said cathode is movable in a direction toward said electrode to vary the spacing between said cathode and said electrode.

42. A halogen generator as in claim 41, wherein said cathode is movable from a first position in which said electrode is spaced from said cathode by a first distance which is at least 0.075 inch, to a second position in which said electrode is spaced from said cathode by a second distance, said second distance being smaller than said first distance.

43. A halogen generator as in claim 42, wherein said cathode is in said first distance with said electrode rotating at a first rotational speed and in said second distance with said electrode rotating at a second rotational speed, said second rotational speed being greater than said first rotational speed.

44. A halogen generator as in claim 43, wherein said cathode is connected to a biasing mechanism which biases said cathode to lie in said first position when said electrode rotates at said first rotational speed.

45. A halogen generator as in claim 31, wherein said electrode is spaced from said cathode by a distance with ranges from about 0.075 inches to about 0.15 inches.

46. A halogen generator for producing a halogen sanitizing agent in a body of water of a water feature, said halogen generator comprising a bipolar cell including at least one electrode positioned between an outer anode and outer cathode, said electrode being mounted to rotate relative to said anode and said cathode, and a source of electricity connected to said anode and said cathode without connection to said rotary electrode, wherein said electrode includes a plurality of vanes which face said cathode, said vanes being configured to circulate water between said electrode and said anode and cathode.

47. A halogen generator as in claim 46, wherein said vanes are spaced sufficiently close to said cathode to inhibit scale formation on said cathode, but generally not to contact said cathode.

48. A halogen generator as in claim 47, wherein said vanes are spaced from said cathode by a distance which ranges between about 0.03 and about 0.1 inches.

49. A halogen generator as in claim 48, wherein said electrode is spaced from said cathode by a distance with ranges between about 0.075 and about 0.15 inches.

50. A halogen generator as in claim 46, wherein said vanes are formed of a non-conductive material.

51. A halogen generator as in claim 46, wherein said cathode is movable in a direction toward said electrode to vary the spacing between said cathode and said vanes on said electrode.

52. A halogen generator as in claim 51, wherein said cathode is movable from a first position in which said vanes are spaced from said cathode by a first distance which is at least 0.030 inch, to a second position in which said vanes are spaced from said cathode by a second distance, said second distance being smaller than said first distance.

53. A halogen generator as in claim 52, wherein said cathode is in said first distance with said vanes rotating at a first rotational speed and in said second distance with said vanes rotating at a second rotational speed, said second rotational speed being greater than said first rotational speed.

54. A halogen generator as in claim 53, wherein said cathode is connected to a biasing mechanism which biases said cathode to lie in said first position when said electrode rotates at said first rotational speed.

55. A method of operating a halogen generator having an electrolytic cell mounted in a water circulation line of a water feature, said method involving the steps of:
  producing a flow of water within the water circulation line and across a sensor;
  sensing the ionic potential of the water within the water circulation line;
  determining whether said sensed ionic potential is below a desired preset ionic potential level;

generating an activation signal if said sensed ionic potential is less than said preset ionic potential level;

energizing said electrolytic cell in response to said activation signal; and producing a water flow through said electrolytic cell while said electrolytic cell is energized.

56. The method of claim 55, such that said step of determining whether said sensed ionic potential is below a desired preset ionic potential level takes place only when said electrolytic cell is de-energized.

57. The method of claim 56, such that said step of determining whether said sensed ionic potential is below a desired preset ionic potential level takes place periodically at desired preset detection time intervals.

58. The method of claim 57, further comprising the step of de-energizing the electrolytic cell after said energizing step has lasted for a desired preset activation time interval.

59. The method of claim 58, further comprising the step of providing an LED display to indicate when the electrolytic cell is energized and when said electrolytic cell is de-energized.

60. A halogen generator for producing a halogen sanitizing agent in a body of water of a water feature, said generator comprising a first electrode and an impeller which have generally parallel, opposing surfaces, said impeller being rotatable to motivate water flow between said electrode and said impeller, and being sufficiently closely spaced to said electrode to inhibit scale formation on said electrode without contacting said electrode, said surface of said impeller lying generally parallel to said surface of said electrode as said impeller rotates relative to said electrode.

61. A halogen generator as in claim 60, wherein said electrode comprises a cathode.

62. A halogen generator as in claim 61, wherein said surface of said impeller is an electrode coupled to a source of electricity so as to function as an anode of said generator.

63. A halogen generator as in claim 61, wherein said impeller comprises at least one vane attached to said surface of said impeller facing said cathode.

64. A halogen generator as in claim 63, wherein said electrode surface and said impeller surface are spaced apart by about 0.15 inches.

65. A halogen generator as in claim 63, wherein said vane and said electrode surface are spaced apart by a distance within the range from 0.010 inches to 0.030 inches.

66. A halogen generator as in claim 60, wherein said electrode comprises an anode and said impeller comprises a cathode.

67. A halogen generator as in claim 60 additionally comprising a second electrode positioned generally parallel to said impeller on a side of said impeller opposite of said first electrode.

68. A halogen generator as in claim 67, wherein said first electrode is a cathode and said second electrode is an anode.

69. A halogen generator as in claim 68, wherein said impeller comprises a first electrode surface facing said cathode and a second electrode surface facing said anode, said first and second electrode surfaces of said impeller electrically communicating with each other.

* * * * *